(12) United States Patent
Inagaki et al.

(10) Patent No.: US 10,139,703 B2
(45) Date of Patent: Nov. 27, 2018

(54) ISING MODEL QUANTUM COMPUTATION DEVICE

(71) Applicants: NIPPON TELEGRAPH AND TELEPHONE CORPORATION, Chiyoda-ku, Tokyo (JP); Inter-University Research Institute Corporation Research Organization of Information and Systems, Tachikawa-shi, Tokyo (JP); OSAKA UNIVERSITY, Suita-shi, Osaka (JP)

(72) Inventors: Takahiro Inagaki, Atsugi (JP); Hiroki Takesue, Atsugi (JP); Toshimori Honjo, Atsugi (JP); Shoko Utsunomiya, Tokyo (JP); Yoshihisa Yamamoto, Tokyo (JP); Yoshitaka Haribara, Tokyo (JP); Shuhei Tamate, Tokyo (JP); Koji Igarashi, Suita (JP)

(73) Assignees: NIPPON TELEGRAPH AND TELEPHONE CORPORATION, Tokyo (JP); INTER-UNIVERSITY RESEARCH INSTITUTE CORPORATION RESEARCH ORGANIZATION OF INFORMATION AND SYSTEMS, Tokyo (JP); OSAKA UNIVERSITY, Osaka (JP)

( * ) Notice: Subject to any disclaimer, the term of this patent is extended or adjusted under 35 U.S.C. 154(b) by 0 days.

(21) Appl. No.: 15/758,536

(22) PCT Filed: Sep. 14, 2016

(86) PCT No.: PCT/JP2016/077180
§ 371 (c)(1),
(2) Date: Mar. 8, 2018

(87) PCT Pub. No.: WO2017/047666
PCT Pub. Date: Mar. 23, 2017

(65) Prior Publication Data
US 2018/0246393 A1    Aug. 30, 2018

(30) Foreign Application Priority Data

Sep. 15, 2015  (JP) .................. 2015-181549

(51) Int. Cl.
*G02F 2/02* (2006.01)
*G02F 1/39* (2006.01)
(Continued)

(52) U.S. Cl.
CPC ................. *G02F 1/39* (2013.01); *G02F 3/00* (2013.01); *G06N 7/08* (2013.01); *G06N 99/002* (2013.01)

(58) Field of Classification Search
None
See application file for complete search history.

(56) References Cited

U.S. PATENT DOCUMENTS 9,342,792 B2 *  5/2016  Utsunomiya ......... B82Y 10/00
9,411,026 B2 *  8/2016  Yamamoto .......... G06N 99/002
(Continued)

FOREIGN PATENT DOCUMENTS

JP       5354233 B2    11/2013
JP     2014-134710 A    7/2014
(Continued)

OTHER PUBLICATIONS

International Preliminary Report on Patentability dated Mar. 20, 2018 from corresponding International PCT Patent Application PCT/JP2016/077180, 10 pages.
(Continued)

*Primary Examiner* — Rhonda Peace
(74) *Attorney, Agent, or Firm* — Ohlandt, Greeley, Ruggiero & Perle, L.L.P.

(57) ABSTRACT

In an Ising spin measuring step, measurement is suspended after one set of measurement of all Ising spins $\{\sigma_i\}$ is completed before another set of measurement of all Ising spins $\{\sigma_i\}$ is restarted. In an Ising interaction computing step, all Ising interactions relating to all the Ising spins $\sigma_i$ can
(Continued)

be computed with a sufficient time margin on the basis of most recent measurement of Ising spins $\sigma_i$, after one set of measurement of all the Ising spins $\{\sigma_i\}$ is completed before another set of measurement of all the Ising spins $\{\sigma_i\}$ is restarted by the Ising spin measuring step.

20 Claims, 19 Drawing Sheets

(51) Int. Cl.
*G06N 99/00* (2010.01)
*G06N 7/08* (2006.01)
*G02F 3/00* (2006.01)
*G02F 1/35* (2006.01)

(56) References Cited

U.S. PATENT DOCUMENTS

| | | | |
|---|---|---|---|
| 9,830,555 B2* | 11/2017 | Marandi | G02F 3/00 |
| 2012/0023053 A1* | 1/2012 | Harris | B82Y 10/00 |
| | | | 706/45 |
| 2014/0046626 A1 | 2/2014 | Yamamoto et al. | |
| 2014/0200689 A1 | 7/2014 | Utsunomiya et al. | |
| 2016/0162798 A1* | 6/2016 | Marandi | G02F 3/00 |
| | | | 708/191 |
| 2017/0024658 A1 | 1/2017 | Utsunomiya et al. | |
| 2017/0264373 A1* | 9/2017 | Krovi | H04B 10/2557 |

FOREIGN PATENT DOCUMENTS

| | | |
|---|---|---|
| JP | 2015-114354 A | 6/2015 |
| JP | 2015-163922 A | 9/2015 |
| JP | 2015-207032 A | 11/2015 |
| WO | 2015/156126 A1 | 10/2015 |

OTHER PUBLICATIONS

Wang et al, "A Coherent Ising Machine Based on Degenerate Optical Parametric Oscillators," Phys. Rev. A88, 063853, Nov. 12, 2013, 18 pgs.

Inagaki et al., "Simulating one-dimensional Ising spins with optically-coupled time-division-multiplexed optical parametric oscillators", Nonlinear Optics, Jul. 26-31, 2015, 3 pgs.

Takesue et al., "Time-division-multiplexed degenerate optical parametric oscillator for a coherent Ising machine", Summer Topicals Meeting Series (SUM), 2015, TuF4.2, Jul. 13, 2015, pp. 213-214.

International Search Report dated Dec. 6, 2016 from corresponding International PCT Application PCT/JP2016/077180, 2 pgs.

* cited by examiner

ISING MODEL QUANTUM COMPUTATION DEVICE

BACKGROUND

1. Field of the Disclosure

The present disclosure shows a quantum computation device capable of easily solving the Ising model to easily solve an NP-complete problem or the like mapped into the Ising model.

2. Discussion of the Background Art

The Ising model has been researched originally as a model of a magnetic material but recently it is paid attention as a model mapped from an NP-complete problem or the like. However, it is very difficult to solve the Ising model when the number of sites is large. Thus, a quantum annealing machine and a quantum adiabatic machine in which the Ising model is implemented are proposed.

In the quantum annealing machine, after Ising interaction and Zeeman energy are physically implemented, the system is sufficiently cooled so as to realize a ground state, and the ground state is observed, whereby the Ising model is solved. However, in a case where the number of sites is large, the system is trapped into a metastable state in the process of being cooled, and the number of the metastable state exponentially increases with respect to the number of sites, whereby there is a problem in that the system is not easily relaxed from the metastable state to the ground state.

In the quantum adiabatic machine, transverse magnetic field Zeeman energy is physically implemented, and then the system is sufficiently cooled to realize the ground state of only the transverse magnetic field Zeeman energy. Then, the transverse magnetic field Zeeman energy is gradually lowered, Ising interaction is physically implemented slowly, the ground state of the system that includes the Ising interaction and vertical magnetic field Zeeman energy is realized, and ground state is observed, whereby the Ising model is solved. However, when the number of sites is large, there is a problem in that the speed of gradually lowering the transverse magnetic field Zeeman energy and physically implementing the Ising interaction needs to be exponentially decreased with respect to the number of sites.

In a case where the NP-complete problem or the like is mapped into an Ising model, and the Ising model is implemented as a physical spin system, there is a problem of a natural law that Ising interaction between sites that are physically located close to each other is high, and Ising interaction between sites that are physically located far from each other is low. The reason for this is that, in an artificial Ising model in which the NP-complete problem is mapped, there may be cases where Ising interaction between sites that are physically located close to each other is low, and Ising interaction between sites that are physically located far from each other is high. The difficulty in mapping into a natural spin system also makes it difficult to easily solve the NP-complete problem or the like.

CITATION LIST

Patent Literature

Patent Literature 1: Japanese Patent No. 5354233
Patent Literature 2: Japanese Patent Laid-open No. 2014-134710

Non-Patent Literature

Non-Patent Literature 1: Z. Wang, A. Marandi, K. Wen, R. L. Byer and Y. Yamamoto, "A Coherent Ising Machine Based on Degenerate Optical Parametric Oscillators," Phys. Rev. A88, 063853 (2013).

SUMMARY

Patent Literatures 1 and 2 and Non-Patent Literature 1 for solving the above problems are described. An NP-complete problem can be substituted by an Ising model of a magnetic material, and the Ising model of the magnetic material can be substituted by a network of a laser or laser pulse.

Here, in the Ising model of a magnetic material, in a pair of atoms interacting with each other, the directions of spins tend to be oriented in opposite directions (in the case of interaction of antiferromagnetism) or in the identical direction (in the case of interaction of ferromagnetism) such that the energy of spin alignment is the lowest.

On the other hand, in a network of lasers or laser pulses, in a pair of lasers or laser pulses interacting with each other, the polarizations or phases of oscillation tend to be reverse rotations or opposite phases (in the case of interaction of antiferromagnetism), or the identical rotation or the identical phase (in the case of interaction of ferromagnetism) respectively such that the threshold gain of the oscillation mode is the lowest.

In other words, in the system configured by one pair of lasers or laser pulses, the polarization or phases of oscillation can be optimized such that the threshold gain of the oscillation mode is the lowest. On the other hand, in the system configured by many pairs of lasers or laser pulses, when an attempt to optimize the polarizations or phases of oscillation is made for a "certain" pair of lasers or laser pulses, the polarization or phases of oscillation cannot be optimized for "the other" pairs of lasers or laser pulses. Therefore, in the system configured by many pairs of lasers or laser pulses, a "point of compromise" on the polarizations or phases of oscillation as the "overall" network of lasers or laser pulses is searched for.

However, in a case where the polarization or phases of oscillation are optimized in the overall network of lasers or laser pulses, it is necessary to make an attempt to achieve synchronization between the lasers or laser pulses so as to establish a single oscillation mode in the overall network of lasers or laser pulses instead of establishing individual oscillation modes in the respective pairs of lasers or laser pulses.

As described above, according to Patent Literatures 1 and 2 and Non-Patent Literature 1, the pumping energy of each laser or laser pulse is controlled, a single oscillation mode which minimizes the threshold gain in the overall network of lasers or laser pulses is established, the polarization or phase of oscillation of each laser or laser pulse is measured, and the direction of each Ising spin is finally measured. Therefore, the problems of the trapping into the metastable states and the implementation rate of the Ising interaction in the quantum annealing machine and the quantum adiabatic machine can be solved.

In addition, according to Patent Literatures 1 and 2 and Non-Patent Literature 1, it is possible to freely control not only the magnitude of Ising interaction between sites physically located close to each other but also the magnitude of Ising interaction between sites physically located far from each other. Accordingly, the artificial Ising model mapped from an NP-complete problem or the like can be solved regardless of the physical distances between the sites.

Next, Patent Literatures 1 and 2 are concretely explained. First, the magnitude and sign of the pseudo Ising interaction between two surface emission lasers are implemented by controlling the amplitudes and phases of light exchanged between the two surface emission lasers. Next, the pseudo Ising spins of the respective surface emission lasers are measured by measuring the polarization or phases of oscillation in the respective surface emission lasers after the respective surface emission lasers reach a steady state during the light exchange process.

At this time, in order to establish a single oscillation mode in which the polarizations or phases of oscillation in the overall network of surface emission lasers are optimized, it is necessary to achieve synchronization between the surface emission lasers. Therefore, the oscillation frequencies of the surface emission lasers are equalized to an identical frequency by using injection locking from a master laser to the surface emission lasers. However, because the free-running frequencies of the surface emission lasers are slightly different from the oscillation frequency of the master laser, the phases of oscillation of the surface emission lasers in the initial state are unbalanced toward the zero phase or $\pi$ phase in the oscillation of the surface emission lasers in the steady states. Resultantly, incorrect answers are likely to be caused by the unbalanced phases in the initial states.

In addition, in the case where the number of Ising sites is M, the surface emission lasers in the number M are needed, and M(M−1)/2 optical paths are needed between the surface emission lasers. Further, the magnitude and sign of the pseudo Ising interaction between the surface emission lasers cannot be precisely implemented unless the lengths of the optical paths between the surface emission lasers are precisely adjusted. Therefore, in the case where the number of the Ising sites is large, the Ising model quantum computation device becomes massive and complex.

Next, Non-Patent Literature 1 is explained concretely. First, the magnitude and sign of the pseudo Ising interaction between two laser pulses are implemented by controlling the amplitudes and phases of light exchanged between the two laser pulses. Next, the pseudo Ising spins of the respective laser pulses are measured by measuring the phases of oscillation in the respective laser pulses after the respective laser pulses reach a steady state during the light exchange process.

At this time, in order to establish a single oscillation mode in which the phases of oscillation in the overall network of laser pulses are optimized, it is necessary to achieve synchronization between the laser pulses. Therefore, the oscillation frequencies of the laser pulses are equalized to an identical frequency by using a degenerate optical parametric oscillator and a ring resonator. In addition, because the down-conversion by the degenerate optical parametric oscillator, instead of the injection locking by the master laser, is used, the phases of oscillation of the laser pulses in the initial state are not unbalanced toward the zero phase or n phase in the oscillation of the laser pulses in the steady states. Resultantly, the incorrect answers caused by the unbalanced phases in the initial states are unlikely to occur.

Then, a first method to realize a technique disclosed in Non-Patent Literature 1 is explained concretely. According to the first method, a modulator which controls the amplitudes and phases of the light exchanged between laser pulses is arranged on a delay line which has a length equal to the interval of the laser pulses, branches from the ring resonator, and joins the ring resonator. Part of preceding laser pulses propagate through the delay line and are modulated by the modulator, and subsequent laser pulses propagate in the ring resonator and do not propagate through the delay line, so that these laser pulses are combined, and resultantly light is exchanged between the laser pulses. While the circular propagation of the laser pulses in the ring resonator in the above manner is repeated, the phases of the laser pulses are measured after the laser pulses reach a steady state.

Thus, in the case where the number of the Ising sites is M, (M−1) types of delay lines are needed, and the (M−1) modulators are needed. In addition, unless the lengths of the delay lines (equal to the interval between the laser pulses) are precisely adjusted, the magnitude and sign of the pseudo Ising interaction between the laser pulses cannot be precisely implemented. Therefore, in the case where the number of the Ising sites becomes large, the Ising model quantum computation device becomes massive and complex even according to the first method.

Next, a second method for realizing the technique disclosed in Non-Patent Literature 1 is explained concretely. According to the second method, a detector which measures the phases of the laser pulses is arranged at the branching position from the ring resonator. In addition, a computer which computes interactions in the Ising model on the basis of coupling coefficients in the Ising model and the measured phases of the laser pulses is arranged. Further, a modulator which controls the amplitudes and phases of light injected to the laser pulses, on the basis of the computed interactions in the Ising model, is arranged at the joining position to the ring resonator. While the feedback loop constituted by the detector, the computer, and the modulator as above is repeated, the phases of the laser pulses are measured after the laser pulses reach a steady state.

Thus, even in the case where the number of Ising sites is M, the necessary number of each of the detector, computer, and modulator is only one. In addition, neither the optical paths (in Patent Literatures 1 and 2) nor the delay lines (according to the first method), the lengths of which should be precisely adjusted, are necessary. Therefore, even in the case where the number of the Ising sites becomes large, the Ising model quantum computation device becomes small and simple.

Further, it is desirable that the pseudo Ising interaction between laser pulses be close to an instant interaction and not be a delay interaction. Therefore, it is desirable that the computer compute all interactions in the Ising model relating to all the laser pulses after the detector measures the phases of all the laser pulses before all the laser pulses "circulate once" in the ring resonator and the modulator controls the amplitudes and phases of light injected to all the laser pulses.

However, since the time for the computer computing all interactions in the Ising model relating to all the laser pulses increases in proportion to the square of the number of the Ising sites (in the case of the two-body Ising interactions), it can be considered that when the number of Ising sites becomes large the above computing time becomes longer than the time in which all the laser pulses "circulate once" in the ring resonator, due to limitations of clock signals and memories in the computer.

In order to solve the above problems, the object of the present disclosure is to secure sufficient time for computing all interactions in the Ising model relating to all the laser pulses during the process in which the feedback loop constituted by the Ising spin measuring step, the Ising interaction computing step, and the Ising interaction implementing step is repeated, and thereby stabilize the operations in the entire system and lower the possibility of occurrence of incorrect answers even in the case where the number of the Ising sites is large.

Solution to Problem

In order to achieve the above object, the time in which all the laser pulses "circulate once" in the ring resonator is effectively lengthened. In the Ising spin measuring step, the measurement is suspended after one set of measurement of all Ising spins is completed before another set of measurement of all the Ising spins is restarted. In the Ising interaction computing step, all Ising interactions relating to all the Ising spins can be computed with a sufficient time margin on the basis of the measurement of the Ising spins which has been most recently performed, after one set of measurement of all Ising spins is completed before another set of measurement of all the Ising spins is restarted by the Ising spin measuring step.

Specifically, the present disclosure is an Ising model quantum computation device, characterized in including: a degenerate optical parametric oscillator which causes degenerate optical parametric oscillation of a plurality of pseudo spin pulses corresponding to a plurality of spins in the Ising model in a pseudo manner and having an identical oscillation frequency; a ring resonator which circularly propagates the plurality of pseudo spin pulses; a temporary spin measuring unit which temporarily measures pseudo spins of the plurality of pseudo spin pulses by temporarily measuring phases of the plurality of pseudo spin pulses every time the plurality of pseudo spin pulses circularly propagate in the ring resonator, and suspends measurement after one set of measurement is completed before another set of measurement is restarted; an interaction computing unit which temporarily computes all interactions relating to the plurality of pseudo spin pulses, on the basis of coupling coefficients of the Ising model and the pseudo spins of the plurality of pseudo spin pulses which the temporary spin measuring unit has most recently measured, after the temporary spin measuring unit completes one set of measurement before the temporary spin measuring unit restarts another set of measurement; an interaction implementing unit which temporarily implements magnitudes and signs of all the interactions relating to the plurality of pseudo spin pulses which the interaction computing unit has most recently computed, by controlling amplitudes and phases of light injected to the plurality of pseudo spin pulses, after the interaction computing unit completes a temporary computation of all the interactions relating to the plurality of pseudo spin pulses; and a pseudo spin measuring unit which measures the pseudo spins of the plurality of pseudo spin pulses by measuring the phases of the plurality of pseudo spin pulses after the plurality of pseudo spin pulses reach a steady state while a feedback loop constituted by the temporary spin measuring unit, the interaction computing unit, and the interaction implementing unit.

According to the above structure, the time in which all the laser pulses "circulate once" in the ring resonator is effectively lengthened. Therefore, in the Ising interaction computing step, all Ising interactions relating to all the Ising spins can be computed with a sufficient time margin on the basis of the measurement of the Ising spins which has been most recently performed.

In addition, the present disclosure is an Ising model quantum computation device, characterized in that the ring resonator circularly propagates the plurality of successive pseudo spin pulses, which correspond to the plurality of spins in the Ising model in a pseudo manner; and the plurality of pseudo spin pulses circularly propagating in the ring resonator each pass once or more times the position of the branch from the ring resonator to the temporary spin measuring unit, after the temporary spin measuring unit completes one set of measurement before the temporary spin measuring unit restarts another set of measurement.

According to the above structure, in the Ising interaction computing step, all the Ising interactions relating to all the Ising spins can be computed with a sufficient time margin on the basis of the measurement of the Ising spins which has been most recently performed, while the plurality of pseudo spin pulses each pass once or more times the position of the branch from the ring resonator to the temporary spin measuring unit.

In addition, the present disclosure is an Ising model quantum computation device, characterized in that the ring resonator circularly propagates the plurality of successive pseudo spin pulses corresponding to the plurality of spins in the Ising model in a pseudo manner, and a plurality of successive dummy pulses which do not correspond to the plurality of spins in the Ising model; and the plurality of dummy pulses circularly propagating in the ring resonator each pass once the position of a branch from the ring resonator to the temporary spin measuring unit, after the temporary spin measuring unit completes one set of measurement before the temporary spin measuring unit restarts another set of measurement.

According to the above structure, in the Ising interaction computing step, all the Ising interactions relating to all the Ising spins can be computed with a sufficient time margin on the basis of the measurement of the Ising spins which has been most recently performed, while the plurality of dummy pulses each pass once the position of the branch from the ring resonator to the temporary spin measuring unit.

In addition, the present disclosure is an Ising model quantum computation device, characterized in that the degenerate optical parametric oscillator controls oscillation phases and oscillation intensities of the plurality of dummy pulses to a predetermined phase and a predetermined intensity, respectively; and the Ising model quantum computation device performs calibration of a phase characteristic of the quantum computation device by using the plurality of dummy pulses as a reference signal.

According to the above structure, the plurality of pseudo spin pulses, having oscillation phases the optimum solution of which is unknown and oscillation intensities which vary with time during computation, are not used as the reference signal, and the calibration of the phase characteristic of the Ising model quantum computation device can be performed by using as the reference signal the plurality of dummy pulses, which have the predetermined oscillation phase and the predetermined oscillation intensity.

In addition, the present disclosure is the Ising model quantum computation device, characterized in further including a ring-resonance-length control unit which controls a resonance length of the ring resonator such that the oscillation intensities of the plurality of dummy pulses are maximized to a predetermined intensity.

According to the above structure, the resonance length of the ring resonator can be stabilized to a constant value even in the case where the resonance length of the ring resonator can vary with time in correspondence with variations with time in installation environment (e.g., the temperature) of the Ising model quantum computation device. Therefore, it is possible to stabilize the amplification intensity in a phase sensitive amplifier in the degenerate optical parametric oscillator, the timings of interference with the local oscillation light in the temporary spin measuring unit, and the timings of interference with injection pulses in the interaction implementing unit, every time the plurality of pseudo spin pulses circularly propagate in the ring resonator once or more times. In addition, it is possible to precisely perform pulse stabilization in the phase sensitive amplifier in the degenerate optical parametric oscillator, pulse phase measurement in the temporary spin measuring unit, and interaction implementation in the interaction implementing unit, and thus greatly improve the precision of the computations in the Ising model quantum computation device.

In addition, the present disclosure is the Ising model quantum computation device, characterized in further including a local-oscillation-light control unit controlling interference timings between the plurality of pseudo spin pulses and local oscillation light which the temporary spin measuring unit uses for measurement of the phases of the plurality of pseudo spin pulses, in such a manner that a result of interference between the plurality of dummy pulses and the local oscillation light which the temporary spin measuring unit uses for measurement of the phases of the plurality of pseudo spin pulses becomes a predetermined interference result which is expected from a predetermined oscillation phase of the plurality of dummy pulses.

According to the above structure, it is possible to stabilize the timings of interference with the local oscillation light in the temporary spin measuring unit, every time the plurality of pseudo spin pulses circularly propagate in the ring resonator once or more times. Therefore, it is possible to precisely perform the pulse phase measurement in the temporary spin measuring unit, and thus greatly improve the precision of the computations in the Ising model quantum computation device.

In addition, the present disclosure is the Ising model quantum computation device, characterized in further including an injection-pulse control unit controlling interference timings between the plurality of pseudo spin pulses and a plurality of spin injection pulses having oscillation phases with consideration of interactions used by the interaction implementing unit for light injection to the plurality of pseudo spin pulses, in such a manner that a result of interference between the plurality of dummy pulses and a plurality of dummy injection pulses having a predetermined oscillation phase used by the interaction implementing unit for light injection to the plurality of dummy pulses becomes a predetermined interference result which is expected from a predetermined oscillation phase of the plurality of dummy pulses.

According to the above structure, it is possible to stabilize the timings of interference with the injection pulses in the interaction implementing unit, every time the plurality of pseudo spin pulses circularly propagate in the ring resonator once or more times. Therefore, it is possible to precisely perform the interaction implementation in the interaction implementing unit, and thus greatly improve the precision of the computations in the Ising model quantum computation device.

In addition, the present disclosure is the Ising model quantum computation device, characterized in that the interaction implementing unit controls the amplitudes of the light injected to the plurality of pseudo spin pulses to be greater, when an interval from a time at which the temporary spin measuring unit completes one set of measurement to a time at which the temporary spin measuring unit restarts another set of measurement is longer.

The injection intensity into the laser pulses is effectively smaller in the case where the measurement of spins and the implementation of interactions are suspended than in the case where the measurement of spins and the implementation of interactions are not suspended. According to the above structure, the injection intensities into the laser pulses are controlled to be greater when the duration of the suspension of the measurement of spins and the implementation of interactions is longer. Therefore, the balance of the injection intensity into the laser pulses and the pump gain can be maintained even in the case where the measurement of spins and the implementation of interactions are suspended as well as in the case where the measurement of spins and the implementation of interactions are not suspended.

In addition, the present disclosure is the Ising model quantum computation device, characterized in that the degenerate optical parametric oscillator controls a pump rate in degenerate optical parametric oscillation of the plurality of pseudo spin pulses to be smaller, when an interval from a time at which the temporary spin measuring unit completes one set of measurement to a time at which the temporary spin measuring unit restarts another set of measurement is longer.

The injection intensity into the laser pulses is effectively smaller in the case where the measurement of spins and the implementation of interactions are suspended than in the case where the measurement of spins and the implementation of interactions are not suspended. According to the above structure, the pump gain to the laser pulses is controlled to be decreased when the duration of the suspension of the measurement of spins and the implementation of interactions is longer. Therefore, the balance of the injection intensity into the laser pulses and the pump gain can be maintained even in the case where the measurement of spins and the implementation of interactions are suspended as well as in the case where the measurement of spins and the implementation of interactions are not suspended.

In addition, the present disclosure is the Ising model quantum computation device, characterized in that the interaction implementing unit controls the amplitudes of the light injected to the plurality of pseudo spin pulses to be smaller, when an average degree in graph representation of the Ising model is higher.

According to the above structure, the reduction of the injection intensity into the laser pulses having high degrees in graph representation prevents Ising spins having high degrees in graph representation from oscillating between $\sigma=\pm 1$. Therefore, the operation in the entire system does not become unstable, and the possibility of occurrence of incorrect answers is lowered.

As explained above, according to the present disclosure, sufficient time is secured for computing all the interactions in the Ising model relating to all laser pulses during repetition of the feedback loop constituted by the Ising spin measuring step, the Ising interaction computing step, and Ising interaction implementing step. Therefore, even in the case where the number of Ising sites is large, it is possible to stabilize the operations in the entire system, and lower the possibility of occurrence of incorrect answers.

DETAILED DESCRIPTION OF THE PREFERRED EMBODIMENT

Embodiments of the present disclosure will be described with reference to the accompanying drawings. The embodiments described hereinbelow are practical examples of the present disclosure, and the present disclosure is not limited to the following embodiments.

(Configuration and Principle of Ising Model Quantum Computation Device According to Present Disclosure)

Figure 1:
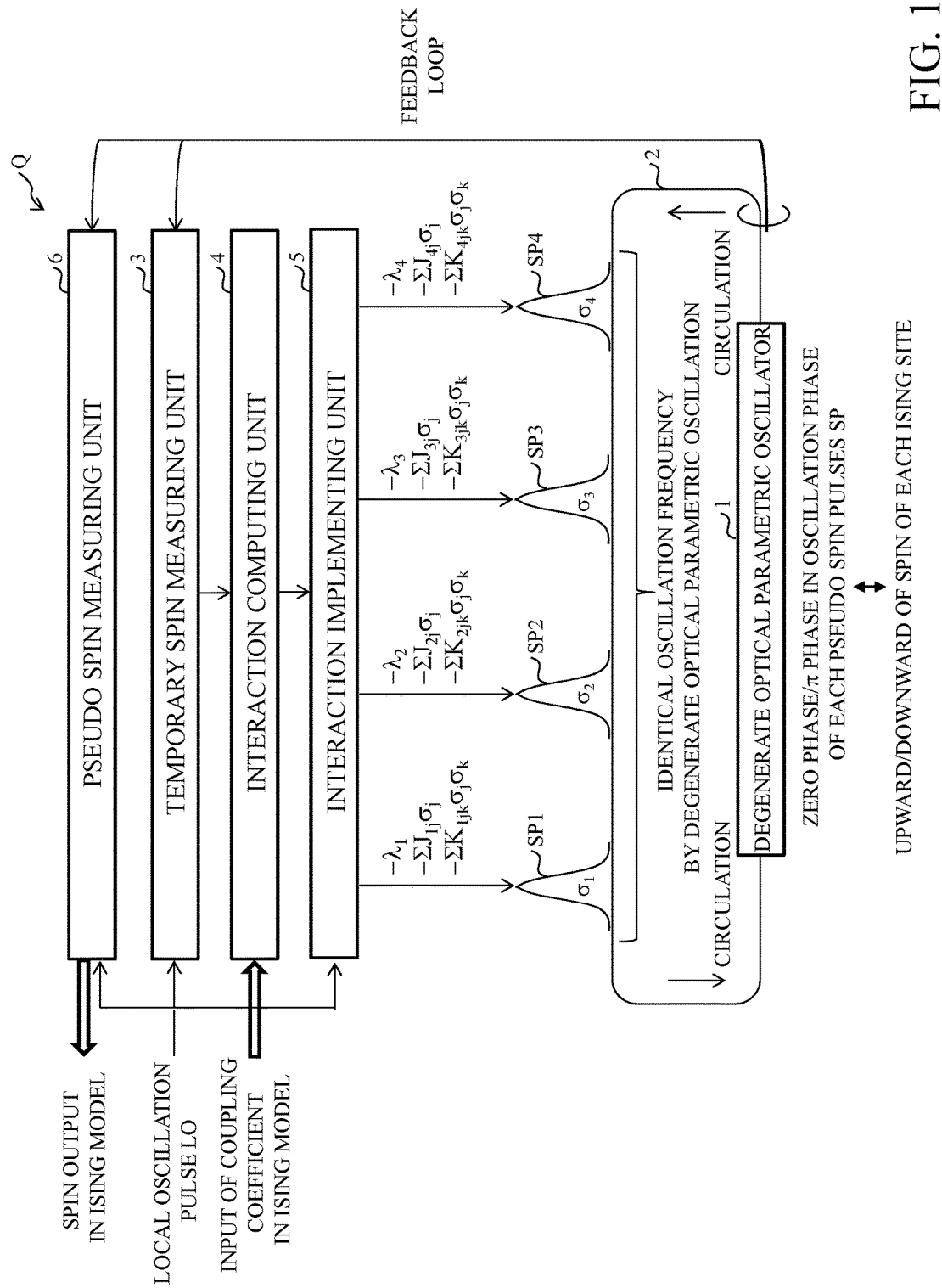
FIG. 1 is a diagram illustrating a configuration of an Ising model quantum computation device according to the present disclosure.

A configuration of an Ising model quantum computation device Q according to the present disclosure is illustrated in FIG. 1. In the present disclosure, an Ising Hamiltonian is assumed to be as Numerical Expression 1 to include one-body to three-body interactions.

$$H = -\sum_{i=1}^{M} \lambda_i \sigma_i - \sum_{i,j=1}^{M} J_{ij} \sigma_i \sigma_j - \sum_{i,j,k=1}^{M} K_{ijk} \sigma_i \sigma_j \sigma_k$$ [Numerical Expression 1]

A degenerate optical parametric oscillator 1 causes degenerate optical parametric oscillation of a plurality of pseudo spin pulses SP1 to SP4 corresponding to a plurality of Ising model spins $\sigma_1$ to $\sigma_4$ in a pseudo manner and having an identical oscillation frequency. A ring resonator 2 allows the plurality of pseudo spin pulses SP1 to SP4 to circularly propagate. The plurality of pseudo spin pulses SP1 to SP4 enter a feedback loop described later, in the order of SP1, SP2, SP3, SP4, SP1, SP2, SP3, SP4, . . . .

Every time the plurality of pseudo spin pulses SP1 to SP4 circularly propagate in the ring resonator 2, a temporary spin measuring unit 3 temporarily measures the pseudo spins $\sigma_1$ to $\sigma_4$ of the plurality of pseudo spin pulses SP1 to SP4 by temporarily measuring the phases of the plurality of pseudo spin pulses SP1 to SP4. Specifically, the temporary spin measuring unit 3 performs homodyne detection on the plurality of pseudo spin pulses SP1 to SP4 by using a local oscillation pulse LO.

An interaction computing unit 4 temporarily computes interactions relating to a certain pseudo spin pulse SPi (i.e., the proportionality factors $-\lambda_i$, $-\Sigma J_{ij}\sigma_j$, and $-\Sigma K_{ijk}\sigma_j\sigma_k$ for $\sigma_i$) on the basis of the coupling coefficients $\lambda_i$, $J_{ij}$, and $K_{ijk}$ in the Ising model relating to the certain pseudo spin pulse SPi and the pseudo spins $\sigma_j$ and $\sigma_k$ of the other pseudo spin pulses SPj and SPk which the temporary spin measuring unit 3 has temporarily measured. In FIG. 1, a case in which i, j, and k=1 to 4 is illustrated.

After an NP-complete problem or the like is mapped into the Ising model, the interaction computing unit 4 inputs the coupling coefficients $\lambda_i$, $J_{ij}$, and $K_{ijk}$ in the Ising model.

An interaction implementing unit 5 controls the amplitudes and phases of light injected to the certain pseudo spin pulse SPi to temporarily implement a magnitude and a sign of the interaction relating to the certain pseudo spin pulse SPi (i.e., the proportionality factors $-\lambda_i$, $-\Sigma J_{ij}\sigma_j$, and $-\Sigma K_{ijk}\sigma_j\sigma_k$ for $\sigma_i$) which the interaction computing unit 4 has temporarily computed. Specifically, the interaction implementing unit 5 generates injected light pulses for the certain pseudo spin pulse SPi by using the local oscillation pulse LO.

A pseudo spin measuring unit 6 measures the pseudo spins $\sigma_1$ to $\sigma_4$ of the plurality of pseudo spin pulses SP1 to SP4 by measuring the phases of the plurality of pseudo spin pulses SP1 to SP4 after the plurality of pseudo spin pulses SP1 to SP4 reach a steady state while a feedback loop constituted by the temporary spin measuring unit 3, the interaction computing unit 4, and the interaction implementing unit 5 is repeated. Specifically, the pseudo spin measuring unit 6 performs homodyne detection on the plurality of pseudo spin pulses SP1 to SP4 by using the local oscillation pulse LO.

After the pseudo spin measuring unit 6 outputs the Ising model spins $\sigma_1$ to $\sigma_4$, the Ising model is demapped to the NP-complete problem or the like.

As explained above, the pumping energy is controlled by the degenerate optical parametric oscillator 1, a single oscillation mode which minimizes the threshold gain in the overall network of the plurality of pseudo spin pulses SP1 to SP4 is established, the oscillation phases of the plurality of pseudo spin pulses SP1 to SP4 are measured, and the directions of the respective Ising spins corresponding to the plurality of pseudo spin pulses SP1 to SP4 are finally measured.

In the explanations with reference to FIG. 1, no degenerate optical parametric amplification step is inserted between the temporary spin measuring step and the interaction implementing step. Since almost no time lag occurs in this case, it is possible to implement interactions between the sites in the Ising model with almost no delay.

In an example of a variation, a degenerate optical parametric amplification step may be inserted between the temporary spin measuring step and the interaction implementing step. Although a time lag to some degree occurs in this case, interactions between the sites in the Ising model can be implemented substantially without delay.

Details of the computations in FIG. 1 are explained. The oscillation phase 0 of the local oscillation pulse LO does not vary through the initial state to the steady state. The oscillation phase $\phi(t)$ of each pseudo spin pulse SP randomly becomes zero or $\pi$ in the initial state. (Each pseudo spin pulse SP undergoes degenerate optical parametric oscillation by the degenerate optical parametric oscillator 1, and is thus in a squeezed state.) The oscillation phase $\phi(t)$ of each pseudo spin pulse SP becomes zero or $\pi$ in the steady state according to the Ising interaction. The values 0 and $\pi$ of the $\phi$(steady) in the steady state respectively correspond to the values +1 and −1 of $\sigma$.

In the case where the coupling coefficient $\lambda_i$ of a one-body interaction with respect to each pseudo spin pulse SP is positive, it is energetically advantageous that the pseudo spin $\sigma$ of the pseudo spin pulse SP be ±1. Thus, the interaction implementing unit 5 facilitates establishment of an oscillation mode in which the oscillating phase $\phi$(steady) of the pseudo spin pulse SP is zero.

In the case where the coupling coefficient $\lambda i$ of a one-body interaction with respect to each pseudo spin pulse SP is negative, it is energetically advantageous that the pseudo spin $\sigma$ of the pseudo spin pulse SP be −1. Thus, the interaction implementing unit 5 facilitates establishment of an oscillation mode in which the oscillating phase $\phi$(steady) of the pseudo spin pulse SP is $\pi$.

In the case where the coupling coefficient $J_{ij}$ of a two-body interaction with respect to two pseudo spin pulses SP is positive, it is energetically advantageous that the pseudo spins $\sigma$ of the two pseudo spin pulses SP have an identical sign. Thus, the interaction implementing unit 5 facilitates establishment of an oscillation mode in which the oscillating phases $\phi$(steady) of the two pseudo spin pulses SP are identical.

In the case where the coupling coefficient $J_{ij}$ of a two-body interaction with respect to two pseudo spin pulses SP is negative, it is energetically advantageous that the pseudo spins $\sigma$ of the two pseudo spin pulses SP have opposite signs. Thus, the interaction implementing unit 5 facilitates establishment of an oscillation mode in which the oscillating phases $\phi$(steady) of the two pseudo spin pulses SP are opposite.

In the case where the coupling coefficient $K_{ijk}$ of a three-body interaction with respect to three pseudo spin pulses SP is positive, it is energetically advantageous that: (1) the pseudo spins $\sigma$ of the three pseudo spin pulses SP are +1; or (2) the pseudo spins $\sigma$ of two of the three pseudo spin pulses SP are −1 and the pseudo spin $\sigma$ of one of the three pseudo spin pulses SP is +1. Thus, the interaction implementing unit 5 facilitates establishment of: (1) an oscillation mode in which the oscillating phases $\phi$(steady) of the three pseudo spin pulses SP are zero; or (2) an oscillation mode in which the oscillating phases $\phi$(steady) of two of the three pseudo spin pulses SP are $\pi$ and the oscillating phase $\phi$(steady) of one of the three pseudo spin pulses SP is zero.

In the case where the coupling coefficient $K_{ijk}$ of a three-body interaction with respect to three pseudo spin pulses SP is negative, it is energetically advantageous that: (1) the pseudo spins $\sigma$ of the three pseudo spin pulses SP are −1; or (2) the pseudo spins $\sigma$ of two of the three pseudo spin pulses SP are +1 and the pseudo spin $\sigma$ of one of the three pseudo spin pulses SP is −1. Thus, the interaction implementing unit 5 facilitates establishment of: (1) an oscillation mode in which the oscillating phases $\phi$(steady) of the three pseudo spin pulses SP are $\pi$; or (2) an oscillation mode in which the oscillating phases $\phi$(steady) of two of the three pseudo spin pulses SP are zero and the oscillating phase $\phi$(steady) of one of the three pseudo spin pulses SP is $\pi$.

However, the interaction implementing unit 5 actually performs implementation for establishing a single oscillation mode in the entire Ising model quantum computation device Q as a whole. Therefore, the aforementioned oscillation modes may actually be established, or may not necessarily be established in each of the pseudo spin pulses SP.

The principle of the computations in FIG. 1 is explained in detail. In each of the pseudo spin pulses SP1, SP2, SP3, SP4, the rate equations for the I-component intensity $c_i$ and the Q-component intensity $s_i$, in correspondence with the van der Pol's equation, are as indicated in Numerical Expressions 2 and 3.

$$\frac{d}{dt}c_i = (-1 + p - (c_i^2 + s_i^2))c_i + \zeta_i + \sum_{j=1}^{M} \xi_{ij} c_j + \sum_{j=1,k=1}^{M} \chi_{ijk} c_j c_k \quad \text{[Numerical Expression 2]}$$

$$\frac{d}{dt}s_i = (-1 - p - (c_i^2 + s_i^2))s_i + \zeta_i + \sum_{j=1}^{M} \xi_{ij} s_j + \sum_{j=1,k=1}^{M} \chi_{ijk} s_j s_k \quad \text{[Numerical Expression 3]}$$

In the equations 2 and 3, t is dimensionless time, and $t=\gamma_s\tau/2$, where $\tau$ is an actual time, and $\gamma_s$ is damping factor of the signal light in the resonator. In addition, $c_i$ and $s_i$ are respectively the I-component intensity and the Q-component intensity after normalization, i.e., $c_i=C_i/A_s$ and $s_i=S_i/A_s$, where $C_i$ and $S_i$ are respectively the intensities of the I-component and the Q-component before normalization. The normalization factor $A_s$ is the intensity of the signal light in the case of p (the pump rate after normalization as explained later)=2, and is represented as $A_s=\sqrt{(\gamma_s\gamma_p/2\kappa^2)}$, where $\gamma_p$ is damping factor in the resonator of the pump light, and $\kappa$ is a degeneracy optical parametric gain. The pump rate after normalization p is represented as $p=F_p/F_{th}$, where $F_p$ is a pump rate before normalization. The normalization factor $F_{th}$ is a threshold pump rate, and is represented as $F_{th}=\gamma_s\sqrt{(\gamma_p)}/4\kappa$.

The term $-c_i$ in Numerical Expression 2 and the term $-s_i$ in Numerical Expression 3 are terms relating to loss in the resonator, and the term $+pc_i$ in Numerical Expression 2 and the term $-ps_i$ in Numerical Expression 3 are terms relating to linear gain. The term $-(c_i^2+s_i^2)c_i$ in Numerical Expression 2 and the term $-(c_i^2+s_i^2)s_i$ in Numerical Expression 3 are terms relating to saturation gain. These terms constitute a van der Pol's equation not containing a perturbation term caused by light injection.

The terms relating to $\zeta_i$ in the Numerical Expressions 2 and 3 are terms relating to the one-body interaction, and perturbation terms for the van der Pol's equation which are caused by light injection. A method, performed by the interaction implementing unit 5, for generating, for the pseudo spin pulse SPi, injection light pulses for implementing one-body interactions ($-\zeta_i$, which has the same sign as the proportionality coefficient $-\lambda_i$ for $\sigma_i$, and is proportional to the proportionality coefficient $-\lambda_i$) is explained.

The interaction computing unit 4 computes one-body interaction ($-\zeta_i$ proportional to the proportionality coefficient $-\lambda_i$ for $\sigma_i$). In the case where $\zeta_i$ is positive, the interaction implementing unit 5 generates an injection light pulse by performing, on the local oscillation pulse LO (having the oscillation phase of zero), phase modulation to maintain the oscillating phase as it is, and amplitude modulation in proportion to $|\zeta_i|$. In the case where $\zeta_i$ is negative, the interaction implementing unit 5 generates an injection light pulse by performing, on the local oscillation pulse LO (having the oscillation phase of zero), phase modulation to delay the oscillation phase by $\pi$ and amplitude modulation in proportion to $|\zeta_i|$.

The terms relating to $\xi_{ij}$ in the Numerical Expressions 2 and 3 are terms relating to the two-body interaction, and perturbation terms for the van der Pol's equation which are caused by light injection. A method, performed by the interaction implementing unit 5, for generating, for the pseudo spin pulse SPi, injection light pulses for implementing a two-body interaction ($-\Sigma\xi_{ij}\sigma_j$, which has the same sign as the proportionality coefficient $-\Sigma J_{ij}\sigma_j$ for $\sigma_i$, and is proportional to the proportionality coefficient $-\Sigma J_{ij}\sigma_j$) is explained.

The temporary spin measuring unit 3 has already measured the oscillation phase $\phi_j(t)$ and the pseudo spin $\sigma_j$ of the pseudo spin pulse SPj before the current circulation. The interaction computing unit 4 computes the two-body interaction ($-\Sigma\xi_{ij}\sigma_j$ in proportion to the proportionality coefficient $-\Sigma J_{ij}\sigma_j$ for $\sigma_i$). In the case where the coefficient $\xi_{ij}$ between the ith and jth sites is positive, the interaction implementing unit 5 generates an injection light pulse by performing, on the local oscillation pulse LO (having the oscillation phase of zero), phase modulation in which the oscillating phase is shifted to $\phi_j(t)$ and is not further reversed, and amplitude modulation in proportion to $|\xi_{ij}|$. In the case where the coefficient $\xi_{ij}$ between the ith and jth sites is negative, the interaction implementing unit 5 generates an injection light pulse by performing, on the local oscillation pulse LO (having the oscillation phase of zero), phase modulation in which the oscillating phase is shifted to $\phi_j(t)$ and is further reversed, and amplitude modulation in proportion to $|\xi_{ij}|$. The interaction implementing unit 5 generates the injection light pulses as described above for all combinations of the ith and jth sites.

The terms relating to $\chi_{ijk}$ in the Numerical Expressions 2 and 3 are terms relating to the three-body interaction, and perturbation terms for the van der Pol's equation which are caused by light injection. A method, performed by the interaction implementing unit 5, for generating, for the pseudo spin pulse SPi, injection light pulses for implementing a three-body interaction ($-\Sigma\chi_{ijk}\sigma_j\sigma_k$, which has the same sign as the proportionality coefficient $-\Sigma K_{ijk}\sigma_j\sigma_k$ for $\sigma_i$, and is proportional to the proportionality coefficient $-\Sigma K_{ijk}\sigma_j\sigma_k$) is explained.

The temporary spin measuring unit 3 has already measured the oscillation phases $\phi_j(t)$, $\phi_k(t)$ and the pseudo spins $\sigma_j$, $\sigma_k$ of the pseudo spin pulses SPj, SPk before the current circulation. The interaction computing unit 4 computes the three-body interaction ($-\Sigma\chi_{ijk}\sigma_j\sigma_k$ in proportion to the proportionality coefficient $-\Sigma K_{ijk}\sigma_j\sigma_k$ for $\sigma_i$). In the case where the coefficient $\chi_{ijk}$ among the ith, jth, and kth sites is positive, the interaction implementing unit 5 generates an injection light pulse by performing, on the local oscillation pulse LO (having the oscillation phase of zero), phase modulation in which the oscillating phase is shifted to $\phi_{jk}(t)$ (explained later) and is not further reversed, and amplitude modulation in proportion to $|\chi_{ijk}|$. In the case where the coefficient $\chi_{ijk}$ among the ith, jth, and kth sites is negative, the interaction implementing unit 5 generates an injection light pulse by performing, on the local oscillation pulse LO (having the oscillation phase of zero), phase modulation in which the oscillating phase is shifted to $\phi_{jk}(t)$ (explained later) and is further reversed, and amplitude modulation in proportion to $|\chi_{ijk}|$. The interaction implementing unit 5 generates the injection light pulses as described above for all combinations of the ith, jth, and kth sites.

The phase $\phi_{jk}(t)$ satisfies $\sigma_j\sigma_k=\cos\phi_{jk}(t)$. The reason why $\phi_{jk}(t)$ has to be defined like this is explained. It is sufficient to linearly superpose the pseudo spin pulses SPi, SPj for implementing the two-body interaction ($-\Sigma\xi_{ij}\sigma_j$ in proportion to the proportionality coefficient $-\Sigma J_{ij}\sigma_j$ for $\sigma_i$) for the pseudo spin pulse SPi. However, in order to implement the three-body interaction ($-\Sigma\chi_{ijk}\sigma_j\sigma_k$ in proportion to the proportionality coefficient $-\Sigma K_{ijk}\sigma_j\sigma_k$ for $\sigma_i$) for the pseudo spin pulse SPi, it is not sufficient to linearly superpose the pseudo spin pulses SPi, SPj, SPk.

Nevertheless, if the nonlinear effect among the pseudo spin pulses SPi, SPj, SPk is utilized, the circuit configuration of the Ising model quantum computation device Q becomes complex. Therefore, in the case where $\sigma_j\sigma_k=\cos\phi_{jk}(t)$, linear superposition of the pseudo spin pulse SPi and the injection light pulse can be used, so that the circuit configuration of the Ising model quantum computation device Q becomes simple.

Further, it is possible to implement a multiple-body interaction among four or more bodies in the Ising model within the limitation of the linear superposition of each pseudo spin pulses SPi and the respective injection light pulse. When a multiple-body interaction among four or more bodies in the Ising model is implemented, the definition $\sigma_j\sigma_k\sigma_l\ldots=\cos\phi_{jkl}\ldots(t)$ (where the left side is a product of the number (N-1) of $\sigma$s in the case of an N-body interaction) is provided, and the pseudo spin pulse SPi and the injection light pulse can be linearly superposed, in a similar manner to the manner described before.

In the steady state, Numerical Expressions 2 and 3 are respectively expressed in Numerical Expressions 4 and 5.

$$c_i^3 + (1-p+s_i^2)c_i - \zeta_i - \sum_{j=1}^{M} \xi_{ij} c_j - \sum_{j,k=1}^{M} X_{ijk} c_j c_k = 0 \quad \text{[Numerical Expression 4]}$$

$$s_i^3 + (1+p+c_i^2)s_i - \zeta_i - \sum_{j=1}^{M} \xi_{ij} s_j - \sum_{j,k=1}^{M} X_{ijk} s_j s_k = 0 \quad \text{[Numerical Expression 5]}$$

The part $p-(c_i^2+s_i^2)$ of Numerical Expression 2 is the saturation gain for the pseudo spin pulse SPi. In the steady state, the saturation gain in the overall network is equal to the photon attenuation rate in the entire network, the I-component $c_i$ is a finite value, and the Q-component $s_i$ is zero. Therefore, the photon attenuation rate $\Gamma$ in the entire network is expressed as Numerical Expression 6.

$$\Gamma = \sum_{i=1}^{M} (p - c_i^2) \sim M - \sum_{i=1}^{M} \zeta_i \sigma_i - \sum_{i,j=1}^{M} \xi_{ij} \sigma_i \sigma_j - \sum_{i,j,k=1}^{M} X_{ijk} \sigma_i \sigma_j \sigma_k \quad \text{[Numerical Expression 6]}$$

The first term on the rightmost side of Numerical Expression 6 indicates the order-zero contribution with respect to the perturbation in the case where the third to fifth terms on the left side of Numerical Expression 4 are perturbation terms. In addition, the second to fourth terms on the rightmost side of Numerical Expression 6 indicate the first-order contribution with respect to the perturbation in the case where the third to fifth terms on the left side of Numerical Expression 4 are perturbation terms. Further, the relationships $\sigma_i = \text{sgn}(c_i) \sim \text{sgn}(c_i^{(0)})$ (where $c_i^{(0)}$ indicates the order-zero contribution with respect to the perturbation) are used.

In the case where the medium of the laser is a homogeneous medium, an oscillating phase state $\{\sigma_i\}$ which realizes the smallest photon attenuation rate $\Gamma$ in the entire laser system is selected. That is, a single specific oscillation mode is selected in the entire laser system. In addition, because of the competition among oscillation modes, the single specific oscillation mode suppresses the other oscillation modes. In other words, $\Gamma$ in Numerical Expression 6 is minimized in the entire laser system. On the other hand, M in Numerical Expression 6 is constant in the entire laser system. Resultantly, $-\Sigma \zeta_i \sigma_i - \Sigma \xi_{ij} \sigma_i \sigma_j - \Sigma \chi_{ijk} \sigma_i \sigma_j \sigma_k$ of Numerical Expression 6 is minimized in the entire laser system. That is, a ground state at which the Ising Hamiltonian of Numerical Expression 1 is minimized is realized.

(Delay Feedback in Quantum Computation Method for Ising Model According to Present Disclosure)

Figure 2:
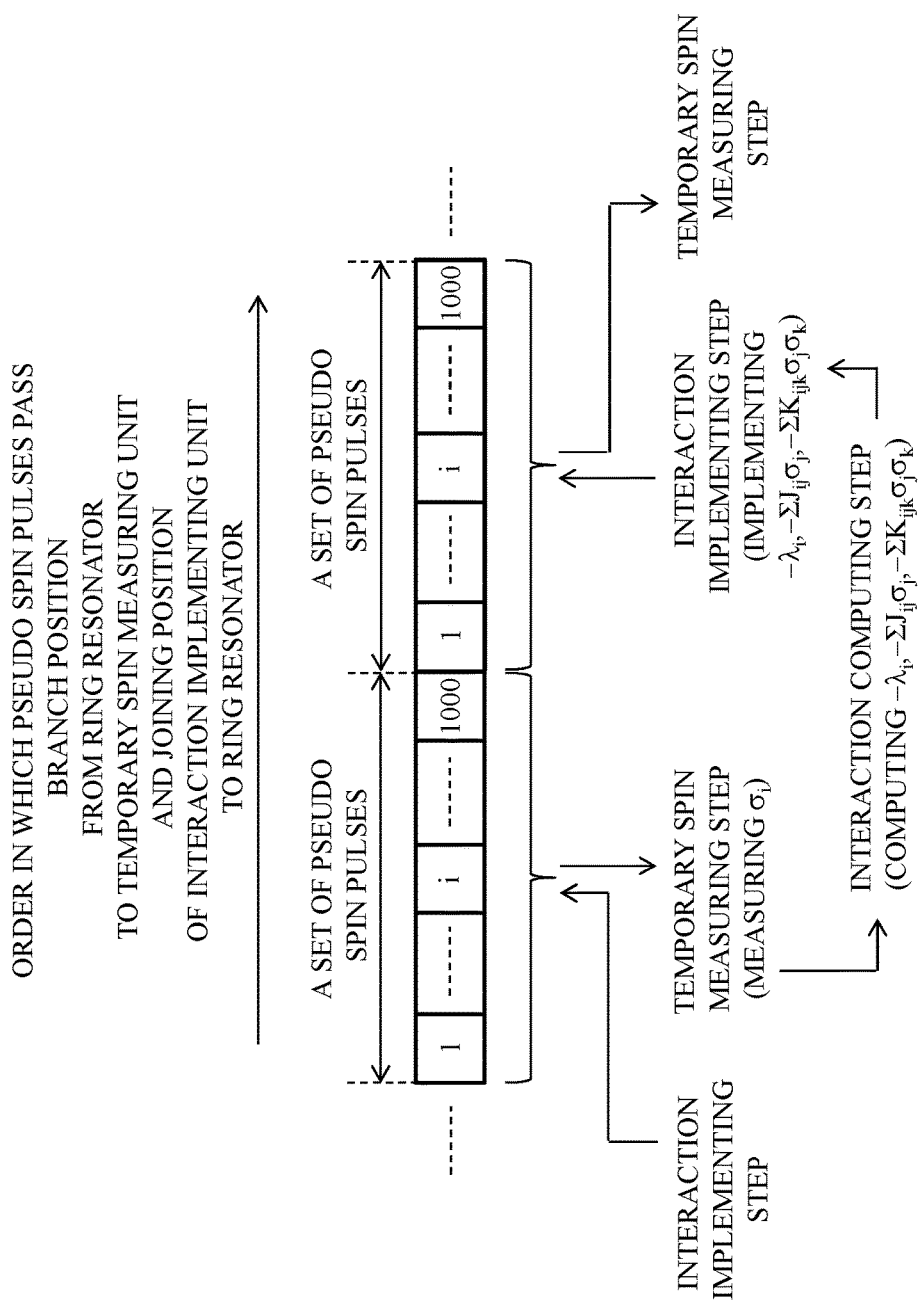
FIG. 2 is a diagram illustrating a first procedure in the Ising model quantum computation method according to the present disclosure.

The first procedure in the Ising model quantum computation method according to the present disclosure is illustrated in FIG. 2. In the first procedure, because 1000 Ising sites exist, 1000 pseudo spin pulses $SP_i$ circularly propagate. In addition, every time a set of pseudo spin pulses $\{SP_i\}$ circulate once, the temporary spin measuring step and the interaction implementing step are performed.

In this situation, it is desirable that the pseudo Ising interactions among the pseudo spin pulses $SP_i$ be close to an instantaneous interaction and not be a delay interaction. Therefore, it is desirable that the interaction computing unit 4 compute all interactions in the Ising model relating to all the pseudo spin pulses $SP_i$ after the temporary spin measuring unit 3 measures the phases of all the pseudo spin pulses $SP_i$ before all the pseudo spin pulses $SP_i$ "circulate once" in the ring resonator 2 and the interaction implementing unit 5 controls the amplitudes and phases of light injected to all pseudo spin pulses $SP_i$.

However, the time in which the interaction computing unit 4 computes all interactions in the Ising model relating to all the pseudo spin pulses $SP_i$ increases in proportion to the square of the number of Ising sites (in the case of two-body Ising interactions). Therefore, because of the limitations of the clock signals and memories in the interaction computing unit 4 (e.g., FPGA), it can be considered that, in the case where the number of Ising sites is large, the time in which the interaction computing unit 4 computes all interactions in the Ising model relating to all the pseudo spin pulses $SP_i$ becomes longer than the time in which all the pseudo spin pulses $SP_i$ "circulate once" in the ring resonator 2.

Figure 3:
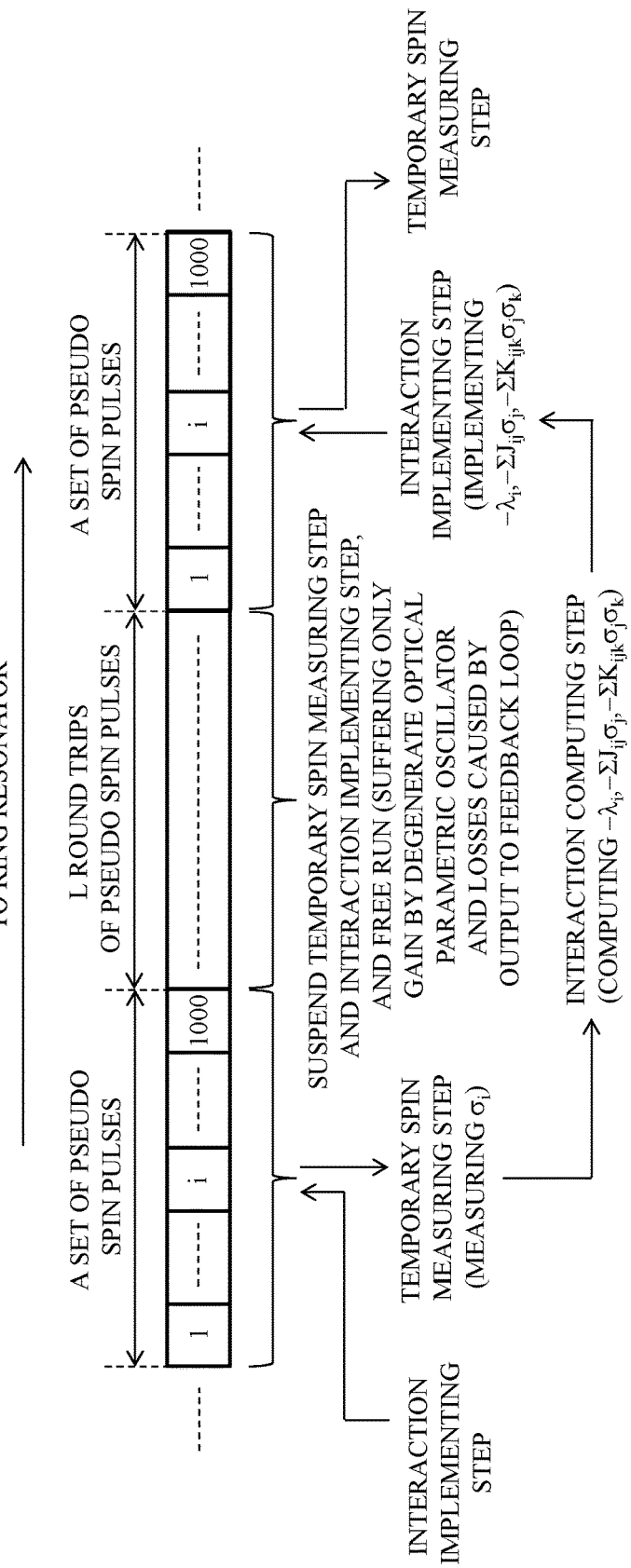
FIG. 3 is a diagram illustrating a second procedure in the Ising model quantum computation method according to the present disclosure.

The second procedure in the Ising model quantum computation method according to the present disclosure is illustrated in FIG. 3. In the second procedure, because 1000 Ising sites exist, 1000 pseudo spin pulses $SP_i$ circularly propagate. In addition, in order to secure sufficient time for computing all the interactions in the Ising model relating to all the pseudo spin pulses $SP_i$, the time for all the pseudo spin pulses $SP_i$ to "circulate once" in the ring resonator 2 is effectively increased. That is, the interaction computing unit 4 computes all the interactions in the Ising model relating to all the pseudo spin pulses $SP_i$ after the temporary spin measuring unit 3 measures the phases of all the pseudo spin pulses $SP_i$ before all the pseudo spin pulses $SP_i$ "circulate L times" in the ring resonator 2 and the interaction implementing unit 5 controls the amplitudes and phases of light injected to all the pseudo spin pulses $SP_i$. Thus, a sufficient time margin is provided for computing the interactions.

Specifically, the temporary spin measuring unit 3 suspends measurement after completing measurement of a set of pseudo spin pulses $\{SP_i\}$ before restarting measurement of a set of pseudo spin pulses $\{SP_i\}$. The plurality of pseudo spin pulses $SP_i$ circularly propagating in the ring resonator 2 each pass L times the position of the branch from the ring resonator 2 to the temporary spin measuring unit 3 after the temporary spin measuring unit 3 completes measurement of a set of pseudo spin pulses $\{SP_i\}$ before the temporary spin measuring unit 3 restarts measurement of a set of pseudo spin pulses $\{SP_i\}$. In addition, while the plurality of pseudo spin pulses $SP_i$ circularly propagating in the ring resonator 2 each pass L times the position of the branch from the ring resonator 2 to the temporary spin measuring unit 3, the plurality of pseudo spin pulses $SP_i$ merely suffer the gain by the degenerate optical parametric oscillator 1 and losses due to output to the feedback loop.

Further, the interaction computing unit 4 computes all the interactions relating to all the pseudo spin pulses $SP_i$ on the basis of the most recent spin measurement, after the temporary spin measuring unit 3 completes measurement of a set of pseudo spin pulses $\{SP_i\}$ before the temporary spin measuring unit 3 restarts measurement of a set of pseudo spin pulses $\{SP_i\}$. Furthermore, the interaction implementing unit 5 controls the amplitudes and phases of light injected to all the pseudo spin pulses $SP_i$, on the basis of the most recent computation of the interactions, after the interaction computing unit 4 completes computation of all the interactions relating to all the pseudo spin pulses $SP_i$.

As explained above, since the time in which all the pseudo spin pulses $SP_i$ "circulate once" in the ring resonator 2 is effectively increased, the interaction computing unit 4 can compute all the interactions relating to all the pseudo spin pulses $SP_i$ on the basis of the most recent spin measurement with a sufficient time margin. Specifically, the interaction computing unit 4 can compute all the interactions relating to all the pseudo spin pulses $SP_i$ on the basis of the most recent spin measurement with a sufficient time margin, while the plurality of pseudo spin pulses $SP_i$ each pass L times the position of the branch from the ring resonator 2 to the temporary spin measuring unit 3.

Figure 4:
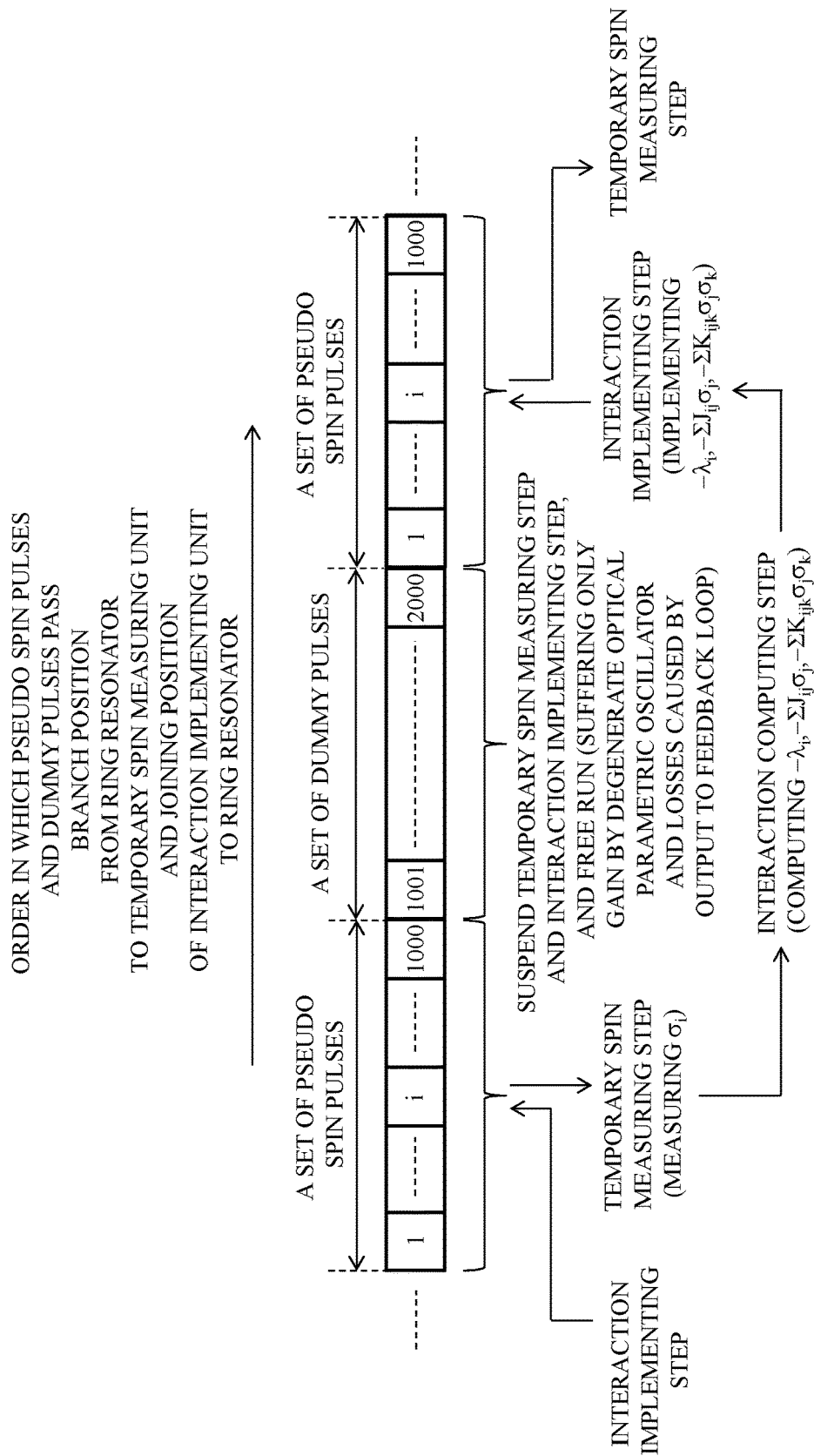
FIG. 4 is a diagram illustrating a third procedure in the Ising model quantum computation method according to the present disclosure.

The third procedure in the Ising model quantum computation method according to the present disclosure is illustrated in FIG. 4. In the third procedure, because 1000 Ising sites exist, 1000 pseudo spin pulses $SP_i$ circularly propagate, and 1000 dummy pulses, which do not correspond to the number of Ising sites, circularly propagate. In addition, in order to secure sufficient time for computing all the interactions in the Ising model relating to all the pseudo spin pulses $SP_i$, the time for all the pseudo spin pulses $SP_i$ to "circulate once" in the ring resonator 2 is effectively increased. That is, the interaction computing unit 4 computes all the interactions in the Ising model relating to all the pseudo spin pulses $SP_i$ after the temporary spin measuring unit 3 measures the phases of all the pseudo spin pulses $SP_i$ before all the dummy pulses pass by the temporary spin measuring unit 3 "once" and the interaction implementing unit 5 controls the amplitudes and phases of light injected to all the pseudo spin pulses $SP_i$. Thus, a sufficient time margin is provided for computing the interactions.

Specifically, the temporary spin measuring unit 3 suspends measurement after measurement of a set of the pseudo spin pulses $\{SP_i\}$ is completed before measurement of a set of the pseudo spin pulses $\{SP_i\}$ is restarted. The plurality of dummy pulses circularly propagating in the ring resonator 2 each pass once the position of the branch from the ring resonator 2 to the temporary spin measuring unit 3 after the temporary spin measuring unit 3 completes measurement of a set of the pseudo spin pulses $\{SP_i\}$ before measurement of a set of the pseudo spin pulses $\{SP_i\}$ is restarted. In addition, while the plurality of dummy pulses circularly propagating in the ring resonator 2 each pass once the position of the branch from the ring resonator 2 to the temporary spin measuring unit 3, the plurality of dummy pulses merely suffer the gain by the degenerate optical parametric oscillator 1 and losses due to output to the feedback loop.

Further, the interaction computing unit 4 computes all the interactions relating to all the pseudo spin pulses $SP_i$ on the basis of the most recent spin measurement, after the temporary spin measuring unit 3 completes measurement of a set of pseudo spin pulses $\{SP_i\}$ before the temporary spin measuring unit 3 restarts measurement of a set of pseudo spin pulses $\{SP_i\}$. Furthermore, the interaction implementing unit 5 controls the amplitudes and phases of light injected to all the pseudo spin pulses $SP_i$, on the basis of the most recent computation of the interactions, after the interaction computing unit 4 completes computation of all the interactions relating to all the pseudo spin pulses $SP_i$.

As explained above, since the time in which all the pseudo spin pulses $SP_i$ "circulate once" in the ring resonator 2 is effectively increased, the interaction computing unit 4 can compute all the interactions relating to all the pseudo spin pulses $SP_i$ on the basis of the most recent spin measurement with a sufficient time margin. Specifically, the interaction computing unit 4 can compute all interactions relating to all the pseudo spin pulses $SP_i$ on the basis of the most recent spin measurement with a sufficient time margin, while the plurality of dummy pulses each pass once the position of the branch from the ring resonator 2 to the temporary spin measuring unit 3.

In addition, although the dummy pulses are not used in quantum computation, and needs a long ring resonator 2 or small pulse interval, the dummy pulses are available in other uses such as the top mark in the circulation and stabilization of the resonator. The stabilization of a phase characteristic of the Ising model quantum computation device according to the present disclosure is illustrated in FIG. 5.

The resonance length of the ring resonator 2 can vary with time in correspondence with variations, with time, in the installation environment (e.g., the temperature) of the Ising model quantum computation device Q. Therefore, if the resonance length of the ring resonator 2 cannot be stabilized to a constant value, it is impossible to stabilize the amplification intensity in a phase sensitive amplifier 10 in the degenerate optical parametric oscillator 1, the timings of interference with the local oscillation light in the temporary spin measuring unit 3, and the timings of interference with injection pulses in the interaction implementing unit 5, every time the plurality of pseudo spin pulses circularly propagate in the ring resonator 2 once or more times. In addition, it is impossible to precisely perform pulse stabilization in the phase sensitive amplifier 10 in the degenerate optical parametric oscillator 1, pulse phase measurement in the temporary spin measuring unit 3, and interaction implementation in the interaction implementing unit 5, and greatly improve the precision of computations in the Ising model quantum computation device Q.

Figure 5:
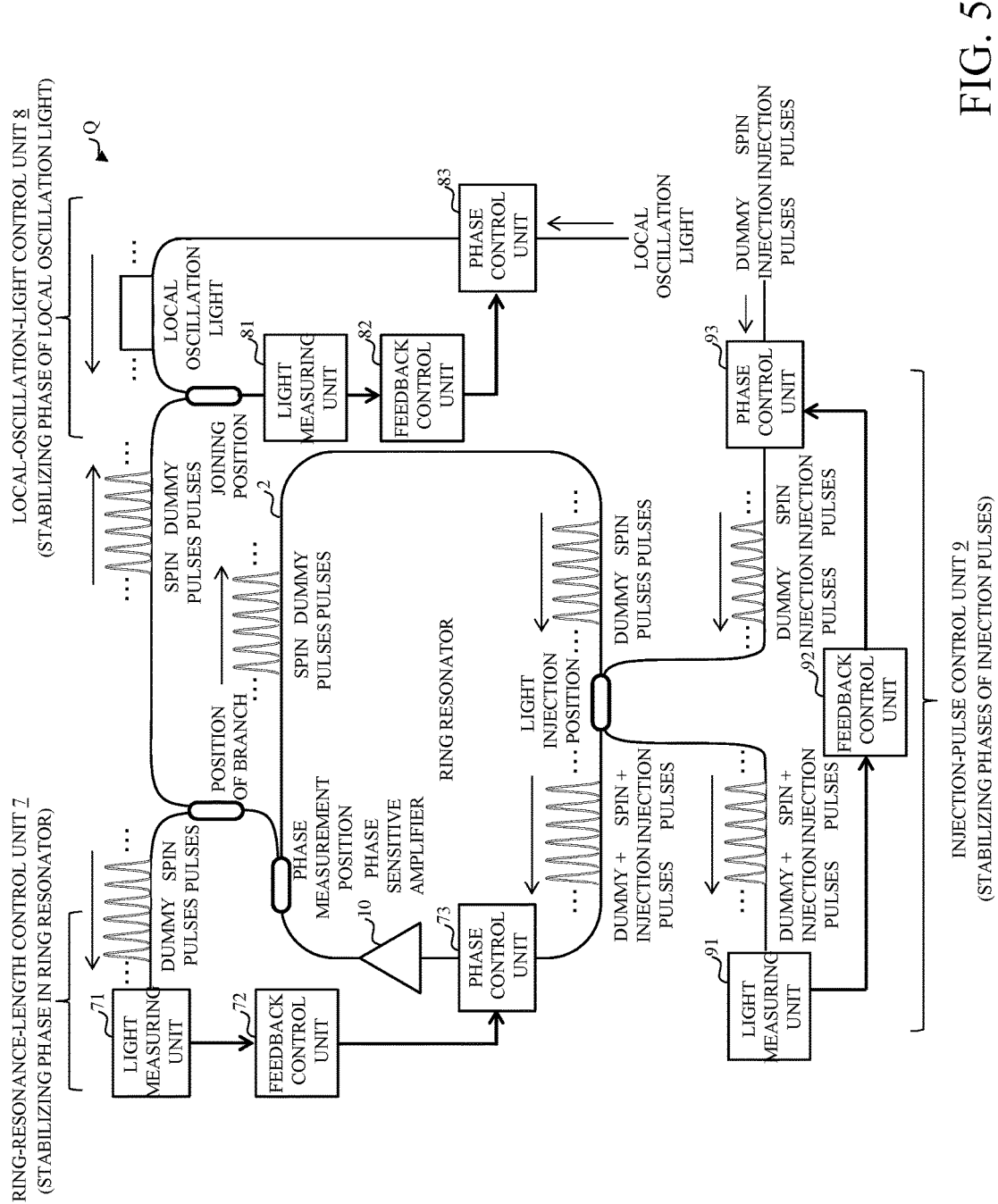
FIG. 5 is a diagram illustrating stabilization of a phase characteristic of the Ising model quantum computation device according to the present disclosure.

Therefore, calibration of the phase characteristic of the Ising model quantum computation device Q is performed as illustrated in FIG. 5. At this time, it is difficult in implementation to use, as a reference signal for use in calibration of the phase characteristic, the plurality of pseudo spin pulses having an oscillation phase of which the optimum solution is unknown and an oscillation intensity which varies with time during computation. However, it is convenient in implementation to use, as a reference signal for use in calibration of the phase characteristic, the plurality of dummy pulses having a predetermined oscillation phase and predetermined oscillation intensity.

Specifically, the degenerate optical parametric oscillator 1 controls the oscillation phases and the oscillation intensities of the plurality of dummy pulses to a predetermined phase and a predetermined intensity, respectively. The Ising model quantum computation device Q uses the plurality of dummy pulses as a reference signal, and performs calibration of the phase characteristic of the quantum computation device Q. For this purpose, the Ising model quantum computation device Q is provided with the ring-resonance-length control unit 7, the local-oscillation-light control unit 8, and the injection-pulse control unit 9 as illustrated in FIG. 5, in addition to the configuration illustrated in FIG. 1.

The ring-resonance-length control unit 7 includes a light measuring unit 71, a feedback control unit 72, and a phase control unit 73. The plurality of dummy pulses and the plurality of pseudo spin pulses are inputted into the ring-resonance-length control unit 7 through a phase measurement position on the ring resonator 2 and the position of the branch to the local-oscillation-light control unit 8. If the resonance length of the ring resonator 2 does not vary with time, the amplification intensity in the phase sensitive amplifier 10 in the degenerate optical parametric oscillator 1 is stabilized, so that the oscillation intensities of the plurality of dummy pulses are maximized to a predetermined intensity. However, when the resonance length of the ring resonator 2 varies with time, the amplification intensity in the phase sensitive amplifier 10 in the degenerate optical parametric oscillator 1 is not stabilized, so that the oscillation intensities of the plurality of dummy pulses are not maximized to the predetermined intensity.

The light measuring unit 71 measures the oscillation intensities of the plurality of dummy pulses. The phase control unit 73 controls the resonance length of the ring resonator 2. The feedback control unit 72 performs feedback control of the phase control unit 73 such that the oscillation intensities measured by the light measuring unit 71 are maximized to the predetermined intensity. The feedback control unit 72 may utilize the PDH (Pound-Drever-Hall) technique, the FM (Frequency Modulation) sideband technique, or the like as a technique for stabilizing the laser oscillation frequency.

The local oscillation light control unit 8 includes a light measuring unit 81, a feedback control unit 82, and a phase control unit 83. The plurality of dummy pulses and the plurality of pseudo spin pulses are inputted into the local-oscillation-light control unit 8 through the phase measurement position on the ring resonator 2 and the position of the branch to the ring-resonance-length control unit 7. In the phase control unit 83, the local oscillation light is inputted into the local-oscillation-light control unit 8.

The light measuring unit 81 outputs a result of interference between the plurality of dummy pulses and the local oscillation light which the temporary spin measuring unit 3 uses for measurement of the phases of the plurality of pseudo spin pulses. The phase control unit 83 controls the timings of interference between the plurality of pseudo spin pulses and the local oscillation light which the temporary spin measuring unit 3 uses for measurement of the phases of the plurality of pseudo spin pulses. The feedback control unit 82 performs feedback control of the phase control unit 83 such that the result of the interference outputted from the light measuring unit 81 becomes a predetermined interference result which is expected from a predetermined oscillation phase of the plurality of dummy pulses. The light measuring unit 81, the phase control unit 83, and the joining position indicated in FIG. 5 can be used in common by the temporary spin measuring unit 3 and the local-oscillation-light control unit 8.

The injection-pulse control unit 9 includes a light measuring unit 91, a feedback control unit 92, and a phase control unit 93. The plurality of dummy injection pulses and the plurality of spin injection pulses are inputted into the injection-pulse control unit 9 in the phase control unit 93. The plurality of dummy injection pulses are pulses having a predetermined oscillation phase which the interaction implementing unit 5 uses for light injection to the plurality of dummy pulses. In addition, the plurality of spin injection pulses are pulses having an oscillation phase in which interactions are considered and which the interaction implementing unit 5 uses for light injection to the plurality of pseudo spin pulses.

At the light injection position on the ring resonator 2, the plurality of dummy pulses and the plurality of pseudo spin pulses circularly propagating in the ring resonator 2 are combined with the plurality of dummy injection pulses and the plurality of spin injection pulses which are outputted from the phase control unit 93. The plurality of pulses combined at the light injection position on the ring resonator 2 are branched toward the ring resonator 2 and the light measuring unit 91.

The light measuring unit 91 outputs a result of interference between the plurality of dummy pulses and the plurality of dummy injection pulses having the predetermined oscillation phase which the interaction implementing unit 5 uses for light injection to the plurality of dummy pulses. The phase control unit 93 controls the timings of interference between the plurality of pseudo spin pulses and the plurality of spin injection pulses having the oscillation phase which the interaction implementing unit 5 uses for light injection to the plurality of pseudo spin pulses and in which interactions are considered. The feedback control unit 92 performs feedback control of the phase control unit 93 such that the result of the interference outputted from the light measuring unit 91 becomes a predetermined interference result which is expected from the predetermined oscillation phase of the plurality of dummy pulses. The phase control unit 93 and the light-injection position on the ring resonator 2 can be used in common by the interaction implementing unit 5 and the injection-pulse control unit 9.

The following particulars should be noted when the calibration of the phase characteristic of the Ising model quantum computation device Q is performed.

(1) The calibration by the ring-resonance-length control unit 7, the local-oscillation-light control unit 8, and the injection-pulse control unit 9 may be performed in parallel.

(2) The calibration by the local-oscillation-light control unit 8 and the injection-pulse control unit 9 may be performed in parallel after the calibration by the ring-resonance-length control unit 7 is completed.

(3) In the case where the speed of the operation of the calibration is low, the calibration may be performed every time the plurality of pseudo spin pulses circularly propagate in the ring resonator 2 multiple times.

(4) In the case where the speed of the operation of the calibration is high, the calibration may be performed every time the plurality of pseudo spin pulses circularly propagate in the ring resonator 2 once.

(5) The calibration and the Ising model computations may be performed in parallel.

(6) The Ising model computation may be performed after completing the calibration.

(7) It is desirable that the ring-resonance-length control unit 7, the local-oscillation-light control unit 8, and injection-pulse control unit 9 grasp the boundaries between the plurality of dummy pulses and the plurality of pseudo spin pulses and the numbers of the plurality of dummy pulses and the plurality of pseudo spin pulses.

Even in the case where the resonance length of the ring resonator 2 varies with time in correspondence with the variations, with time, in the installation environment (e.g., temperature) of the Ising model quantum computation device Q, the resonance length of the ring resonator 2 can be stabilized to a constant value. Therefore, it is possible to stabilize the amplification intensity in the phase sensitive amplifier 10 in the degenerate optical parametric oscillator 1, the timings of interference with the local oscillation light in the temporary spin measuring unit 3, and the timings of interference with the injection pulses in the interaction implementing unit 5, every time the plurality of pseudo spin pulses circularly propagate in the ring resonator 2 once or more times. In addition, it is possible to precisely perform pulse stabilization in the phase sensitive amplifier 10 in the degenerate optical parametric oscillator 1, pulse phase measurement in the temporary spin measuring unit 3, and interaction implementation in the interaction implementing unit 5, and thus greatly improve the precision of the computations in the Ising model quantum computation device Q.

Hereinbelow, the time development and a computation result of the quantum computation in the second procedure are indicated. As a prerequisite, the one-body and three-body interactions are not considered, and only the two-body interactions are considered. Thus, an Ising Hamiltonian as indicated by Numerical Expression 7 and rate equations as Numerical Expressions 8 and 9 are assumed.

$$H = -\sum_{i,j=1}^{M} J_{ij}\sigma_i\sigma_j \quad \text{[Numerical Expression 7]}$$

$$\frac{d}{dt}c_i = (-1 + p - (c_i^2 + s_i^2))c_i + \sum_{j=1}^{M} \xi_{ij}c_j \quad \text{[Numerical Expression 8]}$$

$$\frac{d}{dt}s_i = (-1 - p - (c_i^2 + s_i^2))s_i + \sum_{j=1}^{M} \xi_{ij}s_j \quad \text{[Numerical Expression 9]}$$

It can be understood from Numerical Expressions 8 and 9 that the coupling coefficient ξ and the pump rate p as well as the number L of round trips of the feedback delay determine whether the operation of the entire Ising model quantum computation device Q becomes unstable and whether or not incorrect answers become unlikely to occur.
(Method for Compensating Coupling Coefficient ξ by Feedback Delay of L Round Trips)

The injection intensity to the pseudo spin pulses $SP_i$ is effectively smaller in the case where the spin measurement and the interaction implementation are suspended than in the case where the spin measurement and the interaction implementation are not suspended. That is, the coupling coefficient ξ in the second procedure is effectively 1/(L+1) of the coupling coefficient ξ in the first procedure. In addition, the coupling coefficient ξ in the third procedure (where the number of pseudo spin pulses is equal to the number of dummy pulses) is effectively ½ (=1/(1+1)) of the coupling coefficient ξ in the first procedure.

Therefore, it is considered to maintain the balance of the injection intensity and the pump gain to the pseudo spin pulses $SP_i$ even in the case where the spin measurement and the interaction implementation are suspended as well as in the case where the spin measurement and the interaction implementation are not suspended, by increasing the injection intensity to the pseudo spin pulses $SP_i$ with increase in the duration of the suspension of the spin measurement and the interaction implementation. For example, in the second procedure, a new coupling coefficient is determined to be ξ'=(L+1)ξ. In addition, in the third procedure, a new coupling coefficient is determined to be ξ'=(1+1)ξ=2ξ.

Figure 6:
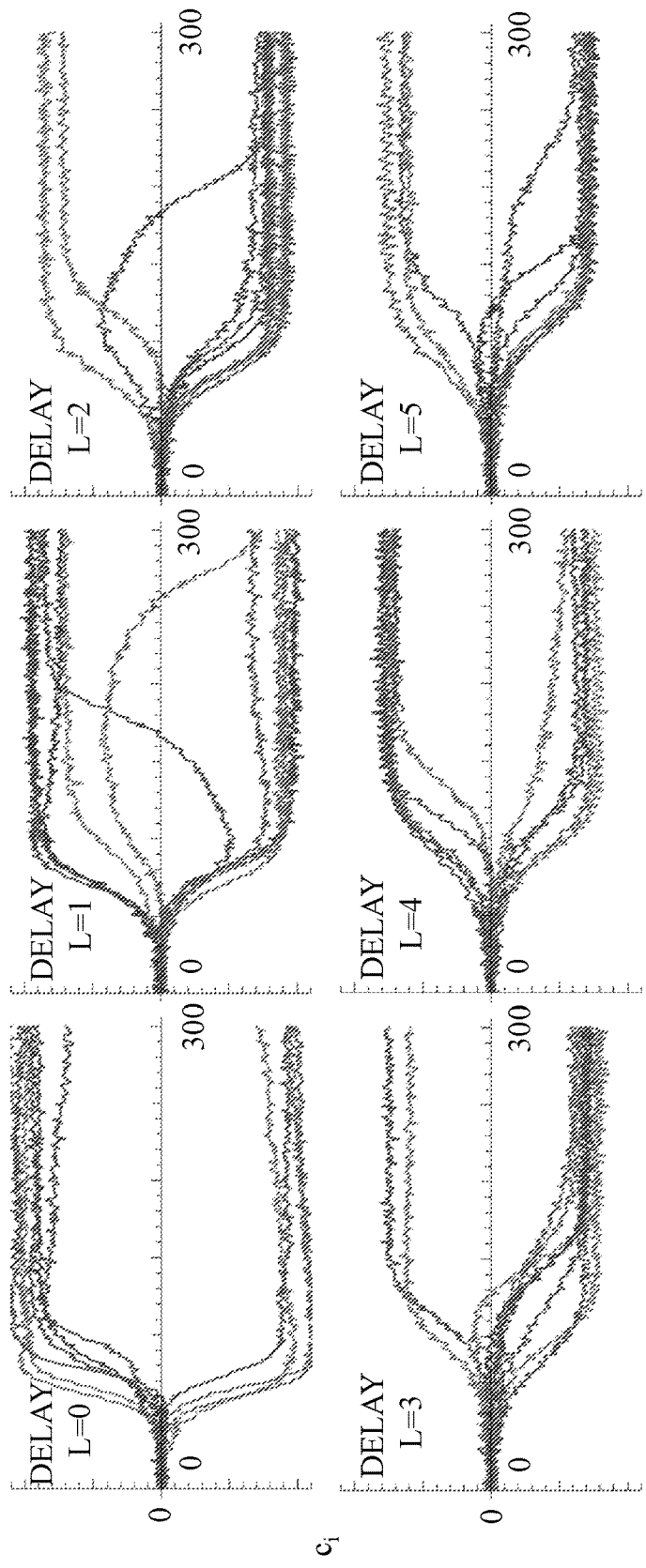
FIG. 6 is a diagram illustrating a time development of a quantum computation of a random graph in the case where the coupling coefficient $\xi$ is not compensated by the feedback delay of L round trips in the second procedure.
Figure 7:
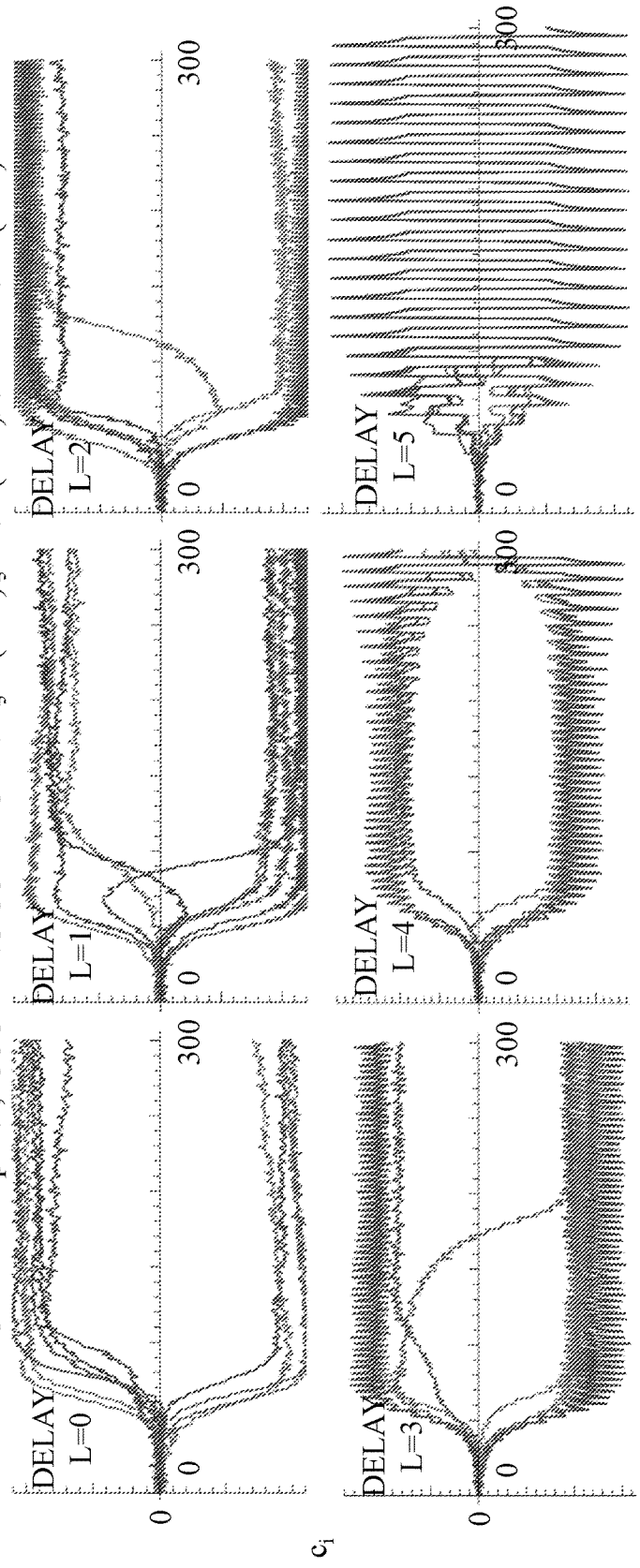
FIG. 7 is a diagram illustrating a time development of a quantum computation of a random graph in the case where the coupling coefficient $\xi$ is compensated by the feedback delay of L round trips in the second procedure.

The time evolutions of quantum computations on a random graph in the case where the coupling coefficient ξ in the second procedure is not compensated by the feedback delay of L round trips and in the case where the coupling coefficient ξ in the second procedure is compensated by the feedback delay of L round trips are respectively illustrated in FIGS. 6 and 7. In addition, computation results of quantum computations on a random graph in the case where the coupling coefficient ξ in the second procedure is not compensated by the feedback delay of L round trips and in the case where the coupling coefficient ξ in the second procedure is compensated by the feedback delay of L round trips are illustrated to FIG. 8.

Figure 8:
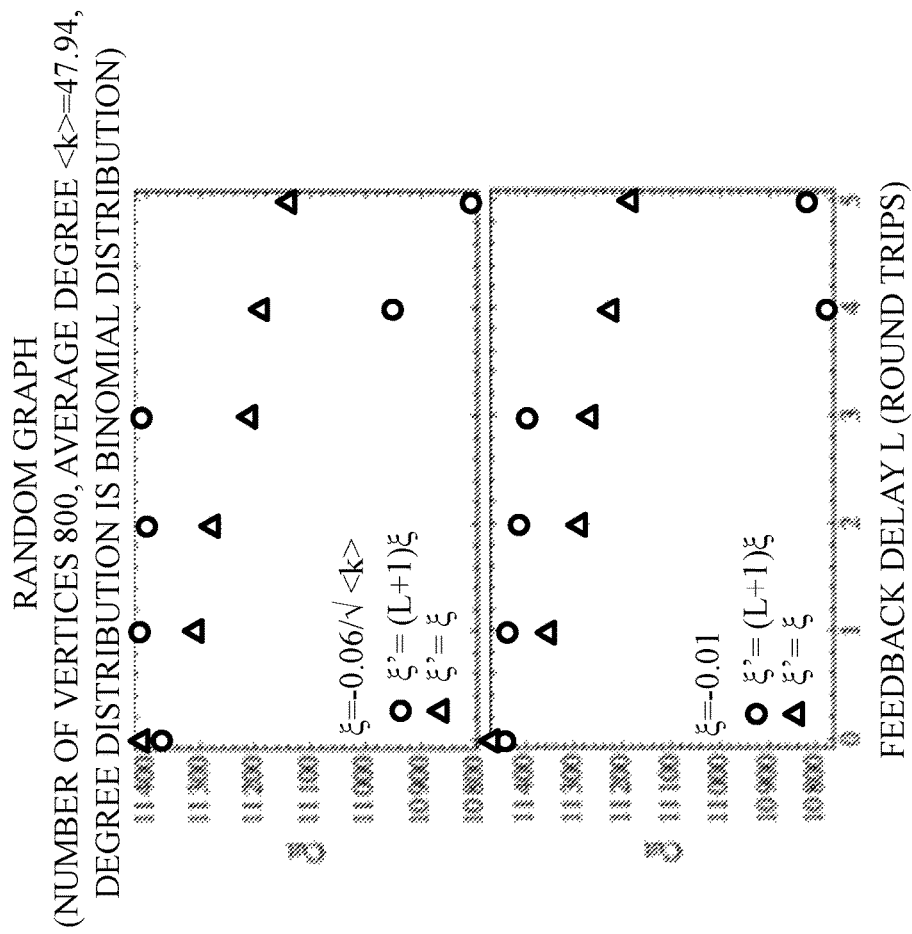
FIG. 8 is a diagram illustrating computation results of quantum computations of random graphs in the cases where the coupling coefficient $\xi$ is or is not compensated by the feedback delay of L round trips in the second procedure.

In the random graph for the cases of FIGS. 6 to 8, the number of the vertices is 800, and the average degree <k> is 47.94, and the distribution of degrees is a binomial distribution.

In FIG. 6 and the plots with the filled triangles in the upper half of FIG. 8, the pump rate is p=1.1, the coupling coefficient is ξ'=ξ=−0.06/√<k>=−0.009, and the coupling coefficient ξ is not compensated by the feedback delay of L round trips. The factor √<k> is explained later by using FIG. 8.

In the case of FIG. 6, although the precision in the quantum computation monotonously decreases with increase in the feedback delay of L round trips, no oscillation behavior is seen in the I-component $c_i$.

In FIG. 7 and the plots with the filled circles in the upper half of FIG. 8, the pump rate is p=1.1, the coupling coefficient is ξ'=(L+1)ξ=−0.06(L+1)/√<k>=−0.009(L+1), and the coupling coefficient ξ is compensated by the feedback delay of L round trips.

In the case of FIG. 7, with the feedback delay of zero or one round trip, no oscillation behavior in the I-component $c_i$ is seen, and the precision of the quantum computation is high. With the feedback delay of two or three round trips, although some oscillation behavior is seen in the I-component $c_i$, the I-component $c_i$ does not oscillate between positive and negative values, and the precision of the quantum computation is maintained.

In the case of FIG. 7, with the feedback delay of four or five round trips, an oscillation behavior is seen in the I-component $c_i$, the I-component $c_i$ oscillates between positive and negative values, and the precision of the quantum computation is lowered. The reason for the above is considered that the coupling coefficient ξ'=(L+1)ξ is too large even when the feedback delay of L round trips is taken into consideration.

A case in which the coupling coefficient ξ is normalized by √<k> is indicated in the upper half of FIG. 8, and a case in which the coupling coefficient ξ is not normalized by √<k> is indicated in the lower half of FIG. 8. It can be read that the oscillation of the I-component $c_i$ between positive and negative values with the feedback delay of four or five round trips or more is more intense in the case where the coupling coefficient ξ is not normalized by √<k> than in the case where the coupling coefficient ξ is normalized by √<k>.

As explained above, since the oscillation between σ=±1 of the Ising spins having high degrees in graph representation is prevented by reducing the injection intensity to the pseudo spin pulses SPi having high degrees in graph representation, the operation of the entire Ising model quantum computation device Q does not become unstable, and incorrect answers are less likely to occur. Although the coupling coefficient ξ is normalized by √<k> in FIGS. 6 to 8, the coupling coefficient ξ may be simply normalized by <k> in a variation.

Figure 9:
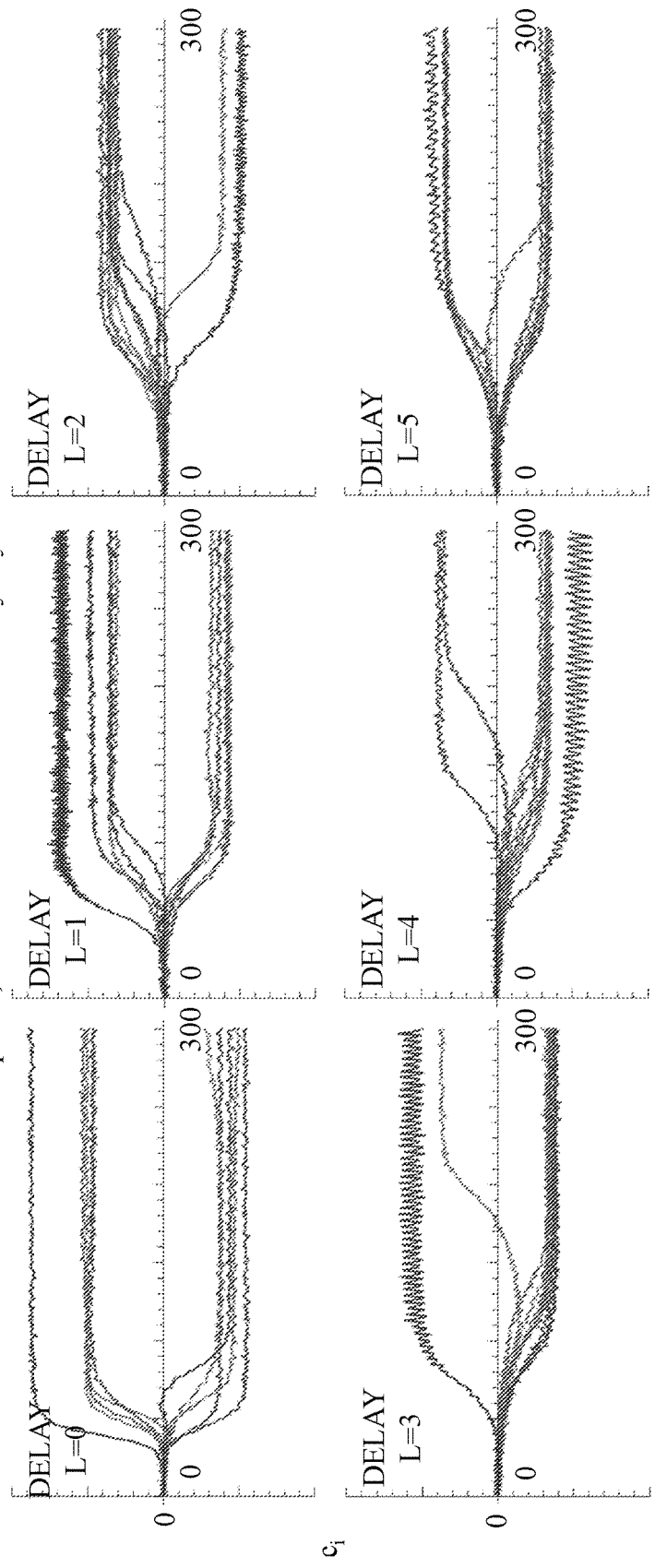
FIG. 9 is a diagram illustrating the time development of a quantum computation of a scale-free graph in the case where the coupling coefficient $\xi$ is not compensated by the feedback delay of L round trips in the second procedure.
Figure 10:
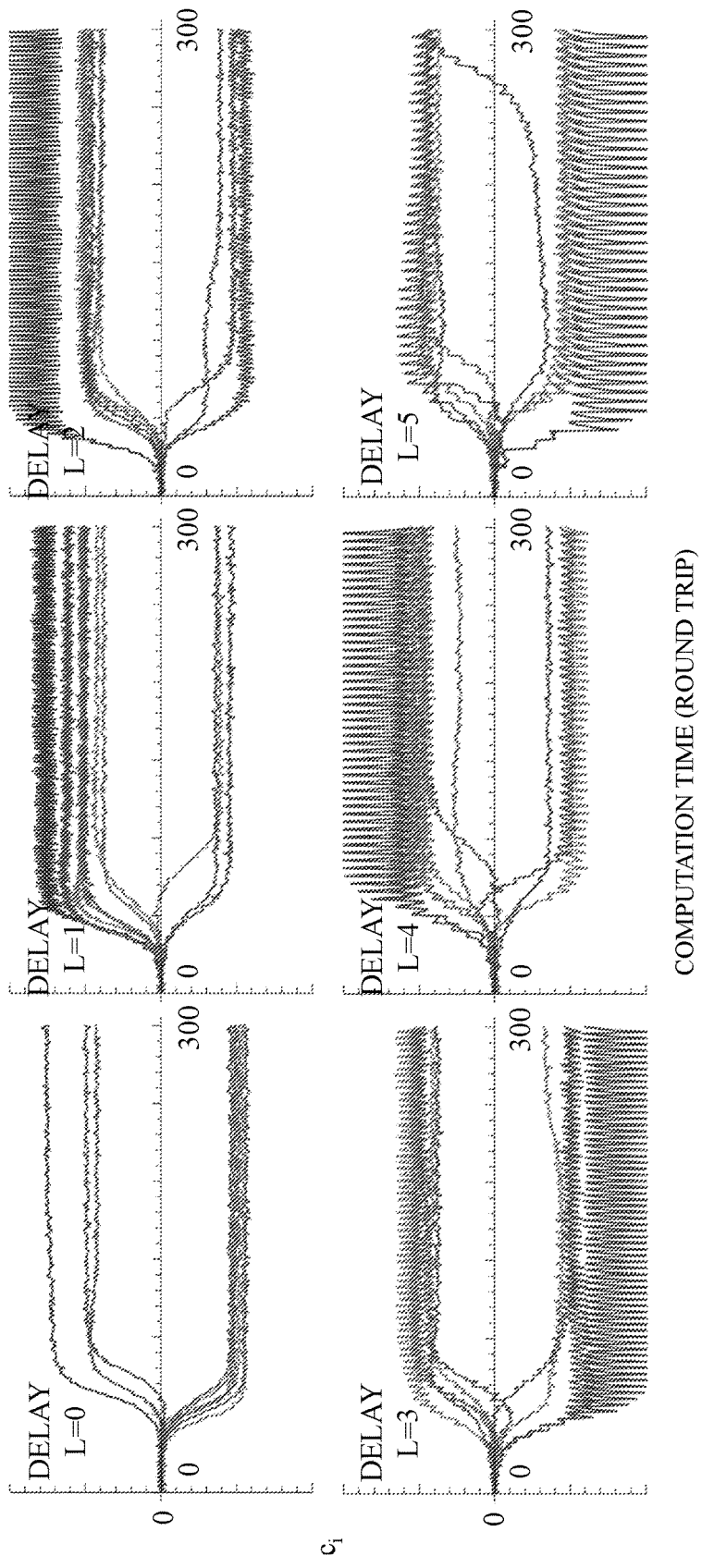
FIG. 10 is a diagram illustrating the time development of a quantum computation of a scale-free graph in the case where the coupling coefficient $\xi$ is compensated by the feedback delay of L round trips in the second procedure.

The time developments of quantum computations on a scale-free graph in the case where the coupling coefficient ξ in the second procedure is not compensated by the feedback delay of L round trips and in the case where the coupling coefficient ξ in the second procedure is compensated by the feedback delay of L round trips are respectively indicated in FIGS. 9 and 10. In addition, computation results of quantum computations on a scale-free graph in the case where the coupling coefficient ξ in the second procedure is not compensated by the feedback delay of L round trips and in the case where the coupling coefficient ξ in the second procedure is compensated by the feedback delay of L round trips are illustrated in FIG. 11.

Figure 11:
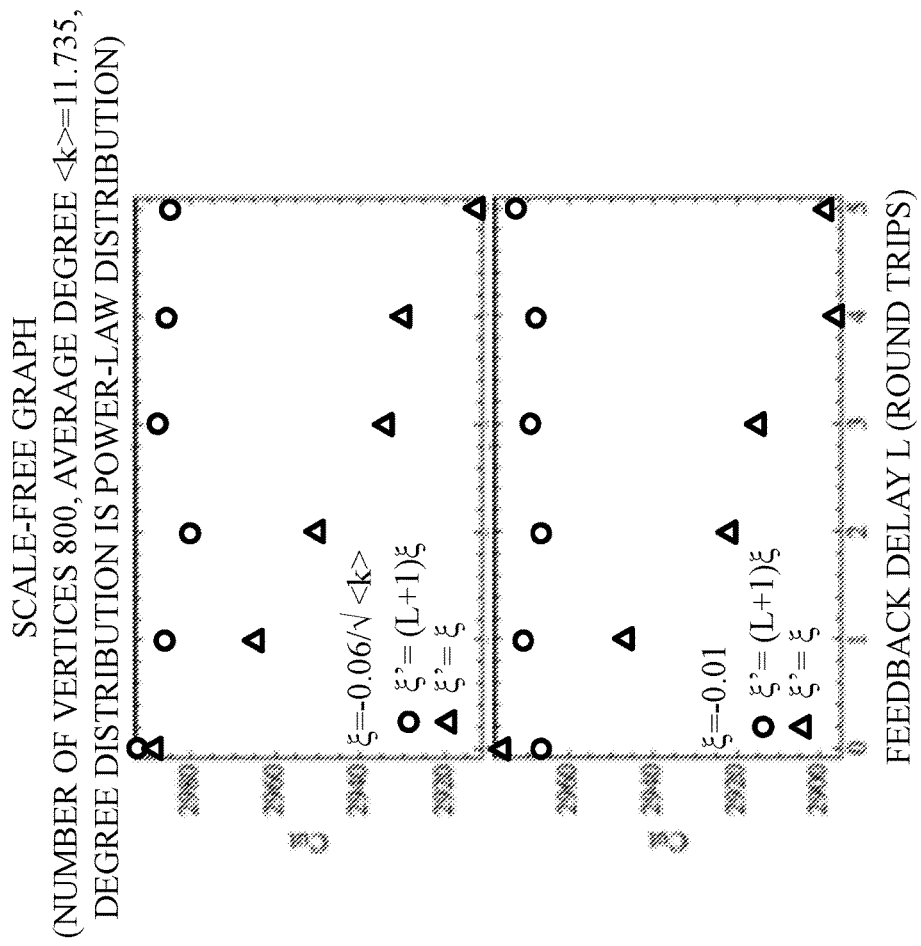
FIG. 11 is a diagram illustrating a computation result of a quantum computation of a scale-free graph in the cases where the coupling coefficient $\xi$ is or is not compensated by the feedback delay of L round trips in the second procedure.

In the scale-free graph for the cases of FIGS. 9 to 11, the number of the vertices is 800, and the average degree $\langle k \rangle$ is 11.735, and the distribution of degrees is a power-law distribution.

In FIG. 9 and the plots with the filled triangles in the upper half of FIG. 11, the pump rate is p=1.1, the coupling coefficient is $\xi'=\xi=-0.06/\sqrt{\langle k \rangle}=-0.018$, and the coupling coefficient $\xi$ is not compensated by the feedback delay of L round trips. The factor $\sqrt{\langle k \rangle}$ is explained later by using FIG. 11.

In the case of FIG. 9, although the precision in the quantum computation monotonously decreases with increase in the feedback delay of L round trips, no oscillation behavior is seen in the I-component $c_i$.

In FIG. 10 and the plots with the filled circles in the upper half of FIG. 11, the pump rate is p=1.1, the coupling coefficient is $\xi'=(L+1)\xi=-0.06(L+1)/\sqrt{\langle k \rangle}=-0.018(L+1)$, and the coupling coefficient $\xi$ is compensated by the feedback delay of L round trips.

In the case of FIG. 10, with the feedback delay of zero or one round trip, no oscillation behavior in the I-component $c_i$ is seen, and the precision of the quantum computation is high. With the feedback delay of two to five round trips, although some oscillation behavior is seen in the I-component $c_i$, the I-component $c_i$ does not oscillate between positive and negative values, and the precision of the quantum computation is maintained.

In the case of FIG. 10, unlike the case of FIG. 7, with the feedback delay of four or five round trips, although an oscillation behavior is seen in the I-component $c_i$, the I-component $c_i$ does not oscillate between positive and negative values, and the precision of the quantum computation is maintained. In the case of FIG. 10, in comparison with the case of FIG. 7, the reason for the above is considered that the injection intensity is small because the average degree $\langle k \rangle$ is small.

A case in which the coupling coefficient $\xi$ is normalized by $\sqrt{\langle k \rangle}$ is indicated in the upper half of FIG. 11, and a case in which the coupling coefficient $\xi$ is not normalized by $\sqrt{\langle k \rangle}$ is indicated in the lower half of FIG. 11. It can be read that even with the feedback delay of four or five round trips or more, the oscillation of the I-component $c_i$ between positive and negative values is not intense even in the case where the coupling coefficient $\xi$ is not normalized by $\sqrt{\langle k \rangle}$ as well as in the case where the coupling coefficient $\xi$ is normalized by $\sqrt{\langle k \rangle}$.

However, since the oscillation between $\sigma=\pm 1$ of the Ising spins having high degrees in graph representation is prevented by reducing the injection intensity to the pseudo spin pulses SPi having high degrees in graph representation, the operation of the entire Ising model quantum computation device Q does not become unstable, and incorrect answers are less likely to occur. Although the coupling coefficient $\xi$ is normalized by $\sqrt{\langle k \rangle}$ in FIGS. 9 to 11, the coupling coefficient $\xi$ may be simply normalized by $\langle k \rangle$ in a variation.

Figure 12:
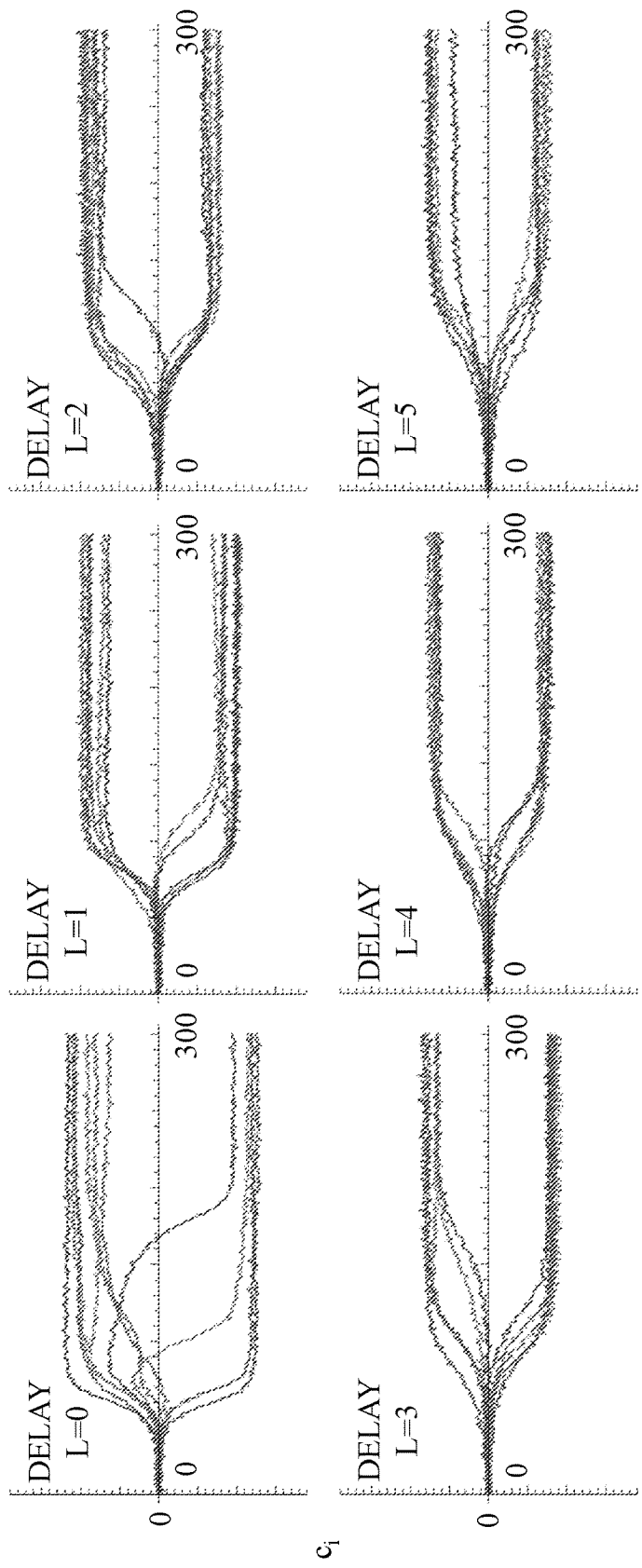
FIG. 12 is a diagram illustrating the time development of a quantum computation of a complete graph in the case where the coupling coefficient $\xi$ is not compensated by the feedback delay of L round trips in the second procedure.
Figure 13:
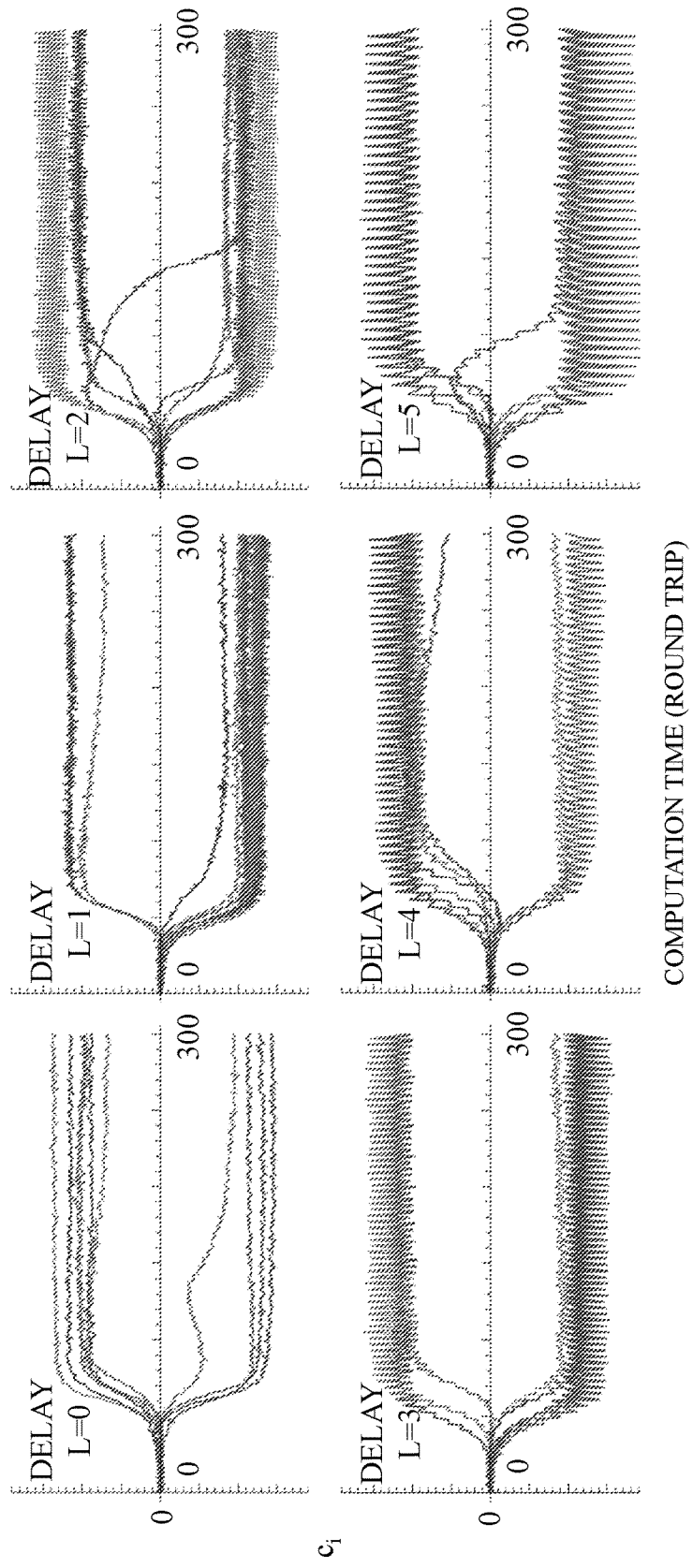
FIG. 13 is a diagram illustrating the time development of a quantum computation of a complete graph in the case where the coupling coefficient $\xi$ is compensated by the feedback delay of L round trips in the second procedure.

The time developments of quantum computations on a complete graph in the case where the coupling coefficient $\xi$ in the second procedure is not compensated by the feedback delay of L round trips and in the case where the coupling coefficient $\xi$ in the second procedure is compensated by the feedback delay of L round trips are respectively indicated in FIGS. 12 and 13. In addition, computation results of quantum computations on a complete graph in the case where the coupling coefficient $\xi$ in the second procedure is not compensated by the feedback delay of L round trips and in the case where the coupling coefficient $\xi$ in the second procedure is compensated by the feedback delay of L round trips are illustrated in FIG. 14.

Figure 14:
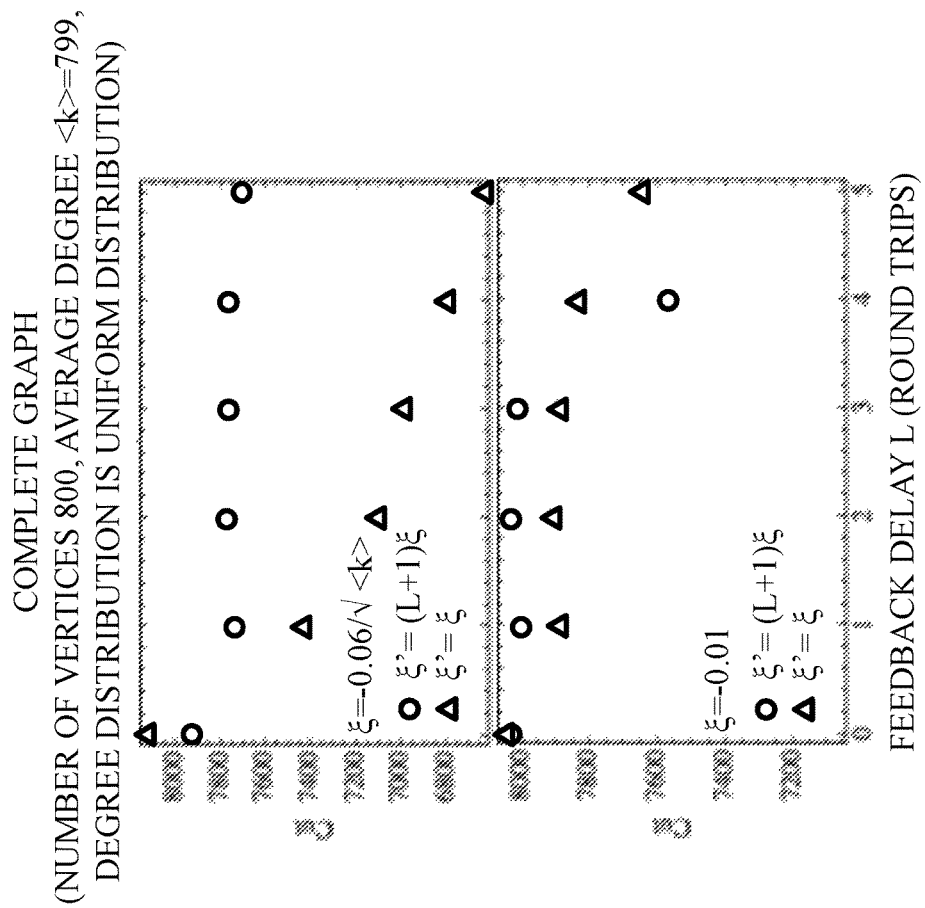
FIG. 14 is a diagram illustrating a computation result of a quantum computation of a complete graph in the cases where the coupling coefficient $\xi$ is or is not compensated by the feedback delay of L round trips in the second procedure.

In the complete graph for the cases of FIGS. 12 to 14, the number of the vertices is 800, and the average degree $\langle k \rangle$ is 799, and the distribution of degrees is a uniform distribution.

In FIG. 12 and the plots with the filled triangles in the upper half of FIG. 14, the pump rate is p=1.1, the coupling coefficient is $\xi'=\xi=-0.06/\sqrt{\langle k \rangle}=-0.002$, and the coupling coefficient $\xi$ is not compensated by the feedback delay of L round trips. The factor $\sqrt{\langle k \rangle}$ is explained later by using FIG. 14.

In the case of FIG. 12, although the precision in the quantum computation monotonously decreases with increase in the feedback delay of L round trips, no oscillation behavior is seen in the I-component $c_i$.

In FIG. 13 and the plots with the filled circles in the upper half of FIG. 14, the pump rate is p=1.1, the coupling coefficient is $\xi'=(L+1)\xi=-0.06(L+1)/\sqrt{\langle k \rangle}=-0.002(L+1)$, and the coupling coefficient $\xi$ is compensated by the feedback delay of L round trips.

In the case of FIG. 13, with the feedback delay of zero or one round trip, no oscillation behavior in the I-component $c_i$ is seen, and the precision of the quantum computation is high. With the feedback delay of two to five round trips, although some oscillation behavior is seen in the I-component $c_i$, the I-component $c_i$ does not oscillate between positive and negative values, and the precision of the quantum computation is maintained.

In the case of FIG. 13, unlike the case of FIG. 7, with the feedback delay of four or five round trips, although an oscillation behavior is seen in the I-component $c_i$, the I-component $c_i$ does not oscillate between positive and negative values, and the precision of the quantum computation is maintained. In the case of FIG. 13, in comparison with the case of FIG. 7, the reason for the above is considered that the coupling coefficient $\xi'$ is small because the average degree $\langle k \rangle$ is great.

A case in which the coupling coefficient $\xi$ is normalized by $\sqrt{\langle k \rangle}$ is indicated in the upper half of FIG. 14, and a case in which the coupling coefficient $\xi$ is not normalized by $\sqrt{\langle k \rangle}$ is indicated in the lower half of FIG. 14. It can be read that with the feedback delay of four or five round trips or more, the oscillation of the I-component $c_i$ between positive and negative values is more intense in the case where the coupling coefficient $\xi$ is not normalized by $\sqrt{\langle k \rangle}$ than in the case where the coupling coefficient $\xi$ is normalized by $\sqrt{\langle k \rangle}$.

Thus, since the oscillation between $\sigma=\pm 1$ of the Ising spins having high degrees in graph representation is prevented by reducing the injection intensity to the pseudo spin pulses SPi having high degrees in graph representation, the operation of the entire Ising model quantum computation device Q does not become unstable, and incorrect answers are less likely to occur. Although the coupling coefficient $\xi$ is normalized by $\sqrt{\langle k \rangle}$ in FIGS. 12 to 14, the coupling coefficient $\xi$ may be simply normalized by $\langle k \rangle$ in a variation.

(Method for Compensating Pump Rate p by Feedback Delay of L Round Trips)

The injection intensity to the pseudo spin pulses $SP_i$ is effectively smaller in the case where the spin measurement and the interaction implementation are suspended than in the case where the spin measurement and the interaction implementation are not suspended. That is, the coupling coefficient $\xi$ in the second procedure is effectively 1/(L+1) of the coupling coefficient $\xi$ in the first procedure. In addition, the coupling coefficient ξ in the third procedure (where the number of pseudo spin pulses is equal to the number of dummy pulses) is effectively ½ (=1/(1+1)) of the coupling coefficient ξ in the first procedure.

Therefore, it is considered to maintain the balance of the injection intensity and the pump gain to the pseudo spin pulses $SP_i$ even in the case where the spin measurement and the interaction implementation are suspended as well as in the case where the spin measurement and the interaction implementation are not suspended, by decreasing the pump gain to the pseudo spin pulses $SP_i$ with increase in the duration of the suspension of the spin measurement and the interaction implementation. For example, in the second procedure, anew pump rate is determined to be p'=p/(L+1), and a new computation time is (L+1) times increased since the pump rate is decreased. In addition, in the third procedure, a new pump rate is determined to be p'=p/(1+1)=p/2, and a new computation time is doubled ((1+1) times increased) since the pump rate is decreased.

Figure 15:
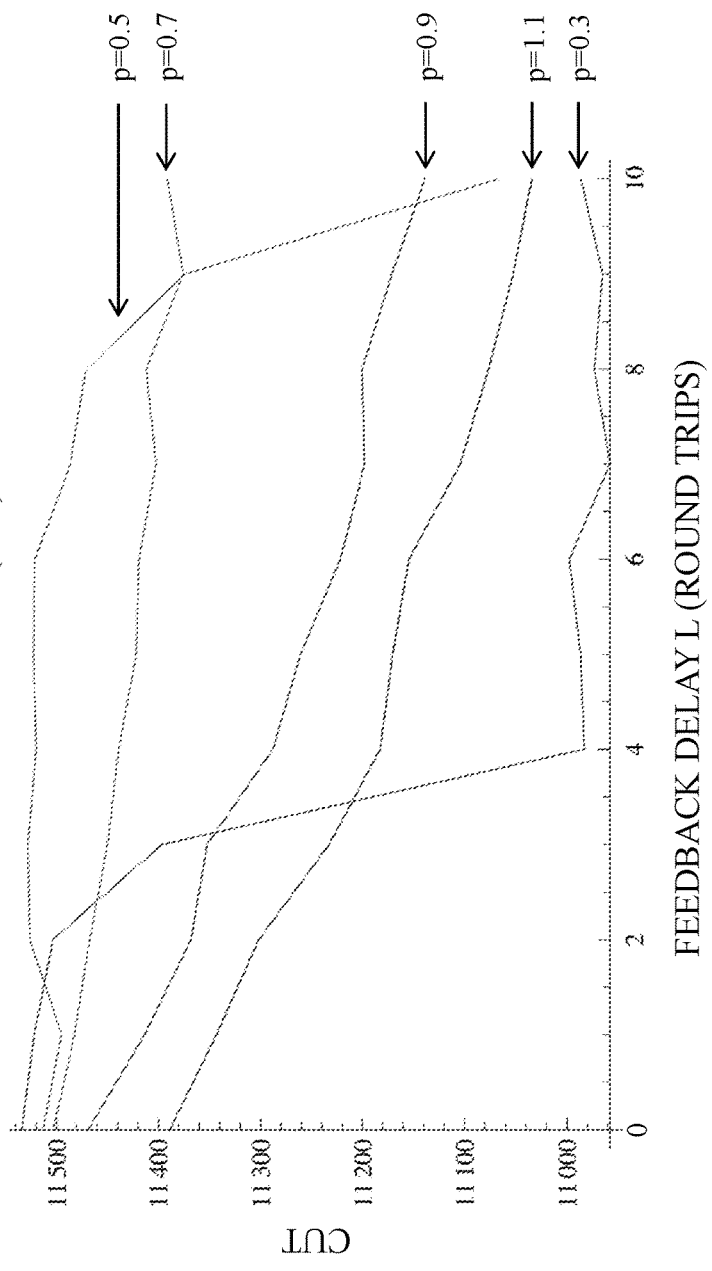
FIG. 15 is a diagram illustrating a computation result of a quantum computation of a random graph in the case where the pump rate p is compensated by the feedback delay of L round trips in the second procedure.

A computation result of a quantum computation on a random graph in the case where the pump rate p in the second procedure is compensated by the feedback delay of L round trips is illustrated to FIG. 15. In the random graph for the case of FIG. 15, similar to the random graph for the cases of FIGS. 6 to 8, the number of the vertices is 800, the average degree <k> is 47.94, and the distribution of degrees is a binomial distribution.

The pump rate is p'=p/(L+1), and the coupling coefficient is ξ'=ξ=−0.06/√<k>=−0.009. The pump rate p is compensated by the feedback delay of L round trips, and the computation time in FIG. 15 is (L+1) times the computation time in FIGS. 6 to 8.

In the case where the pump rate is p=0.3, the precision of the quantum computation is high with the feedback delay of 0 to 2 round trips, drops hard with the feedback delay of 2 to 4 round trips, and is poor with the feedback delay of 4 to 10 round trips. In the case where the pump rate is p=0.5, the precision of the quantum computation is high with the feedback delay of 0 to 8 round trips, and drops hard with the feedback delay of 8 to 10 round trips. In the case where the pump rate is p=0.7, the precision of the quantum computation is high with the feedback delay of 0 to 10 round trips. In the case where the pump rate is p=0.9 or 1.1, the precision of the quantum computation monotonously decreases with increase in the feedback delay. Thus, the pump rates around the values of 0.5 and 0.7 can be considered to be optimum values for the pump rate p.

Figure 16:
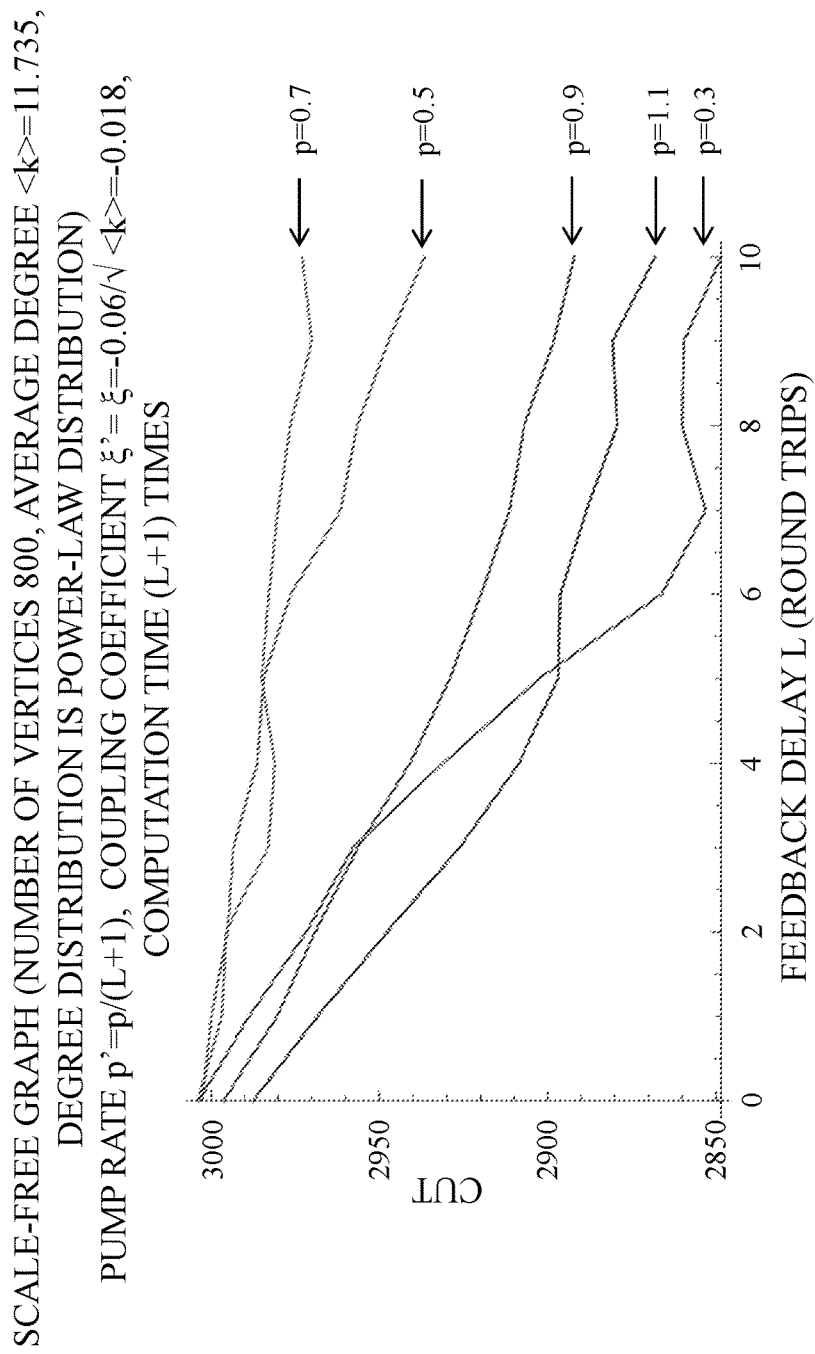
FIG. 16 is a diagram illustrating a computation result of a quantum computation of a scale-free graph in the case where the pump rate p is compensated by the feedback delay of L round trips in the second procedure.

A computation result of a quantum computation on a scale-free graph in the case where the pump rate p in the second procedure is compensated by the feedback delay of L round trips is illustrated in FIG. 16. In the scale-free graph for the case of FIG. 16, similar to the scale-free graph for the cases of FIGS. 9 to 11, the number of the vertices is 800, and the average degree <k> is 11.735, and the distribution of degrees is a power-law distribution.

The pump rate is p'=p/(L+1), and the coupling coefficient is ξ'=ξ=−0.06/√<k>=−0.018. The pump rate p is compensated by the feedback delay of L round trips, and the computation time in FIG. 16 is (L+1) times the computation time in FIGS. 9 to 11.

In the case where the pump rate is p=0.3, the precision of the quantum computation monotonously decreases with increase in the feedback delay. In the case where the pump rate is p=0.5, with the feedback delay of 0 to 10 round trips, the precision of the quantum computation is high although a slight monotonous decrease in the quantum computation exists. In the case where the pump rate is p=0.7, the precision of the quantum computation is high with the feedback delay of 0 to 10 round trips. In the case where the pump rate is p=0.9 or 1.1, the precision of the quantum computation monotonously decreases with increase in the feedback delay. Thus, the pump rates around the values of 0.5 and 0.7 can be considered to be optimum values for the pump rate p.

Figure 17:
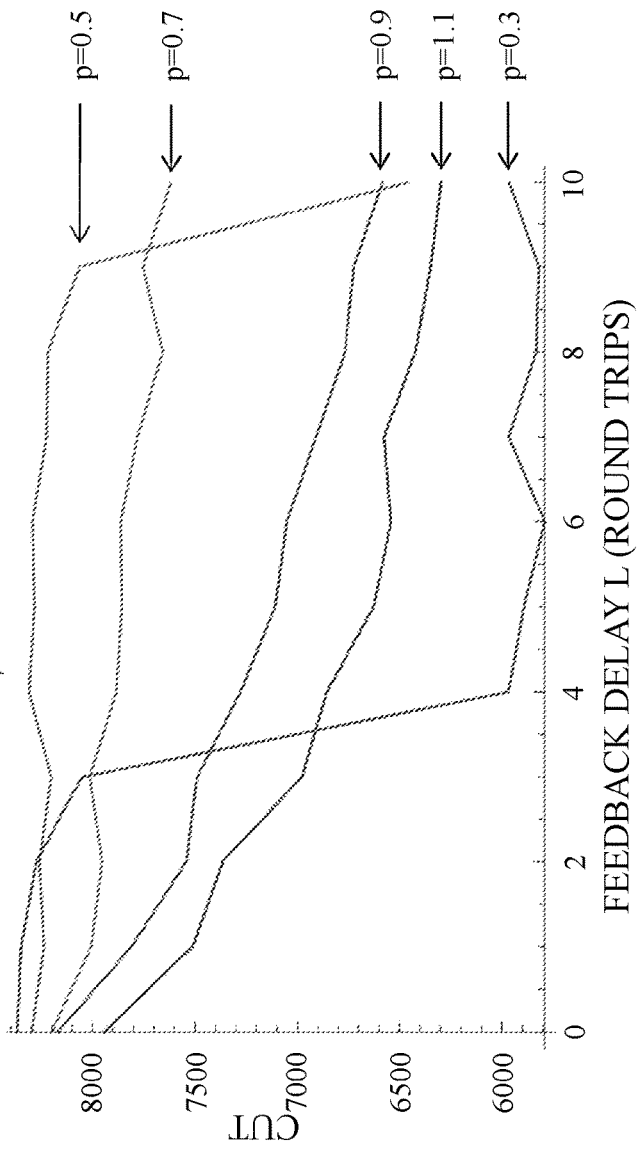
FIG. 17 is a diagram illustrating a computation result of a quantum computation of a complete graph in the case where the pump rate p is compensated by the feedback delay of L round trips in the second procedure.

A computation result of a quantum computation on a complete graph in the case where the pump rate p in the second procedure is compensated by the feedback delay of L round trips is illustrated in FIG. 17. In the complete graph for the case of FIG. 17, similar to the complete graph for the cases of FIGS. 12 to 14, the number of the vertices is 800, the average degree <k> is 799, and the distribution of degrees is a uniform distribution.

The pump rate is p'=p/(L+1), and the coupling coefficient is ξ'=ξ=−0.06/√<k>=−0.002. The pump rate p is compensated by the feedback delay of L round trips, and the computation time in FIG. 17 is (L+1) times the computation time in FIGS. 12 to 14.

In the case where the pump rate is p=0.3, the precision of the quantum computation is high with the feedback delay of 0 to 3 round trips, drops hard with the feedback delay of 3 to 4 round trips, and is poor with the feedback delay of 4 to 10 round trips. In the case where the pump rate is p=0.5, the precision of the quantum computation is high with the feedback delay of 0 to 9 round trips, and drops hard with the feedback delay of 9 to 10 round trips. In the case where the pump rate is p=0.7, the precision of the quantum computation is high with the feedback delay of 0 to 10 round trips. In the case where the pump rate is p=0.9 or 1.1, the precision of the quantum computation monotonously decreases with increase in the feedback delay. Thus, the pump rates around the values of 0.5 and 0.7 can be considered to be optimum values for the pump rate p.

(Method for Setting Coupling Coefficient ξ and Pump Rate p)

In the cases of FIGS. 6 to 14, the coupling coefficient ξ is compensated by the feedback delay of L round trips, and the pump rate p is fixed regardless of the feedback delay of L round trips. In the cases of FIGS. 15 to 17, the pump rate p is compensated by the feedback delay of L round trips, and the coupling coefficient ξ is fixed regardless of the feedback delay of L round trips. In the following, a method for setting the coupling coefficient ξ and the pump rate p before compensating by the feedback delay of L round trips is explained.

Figure 18:
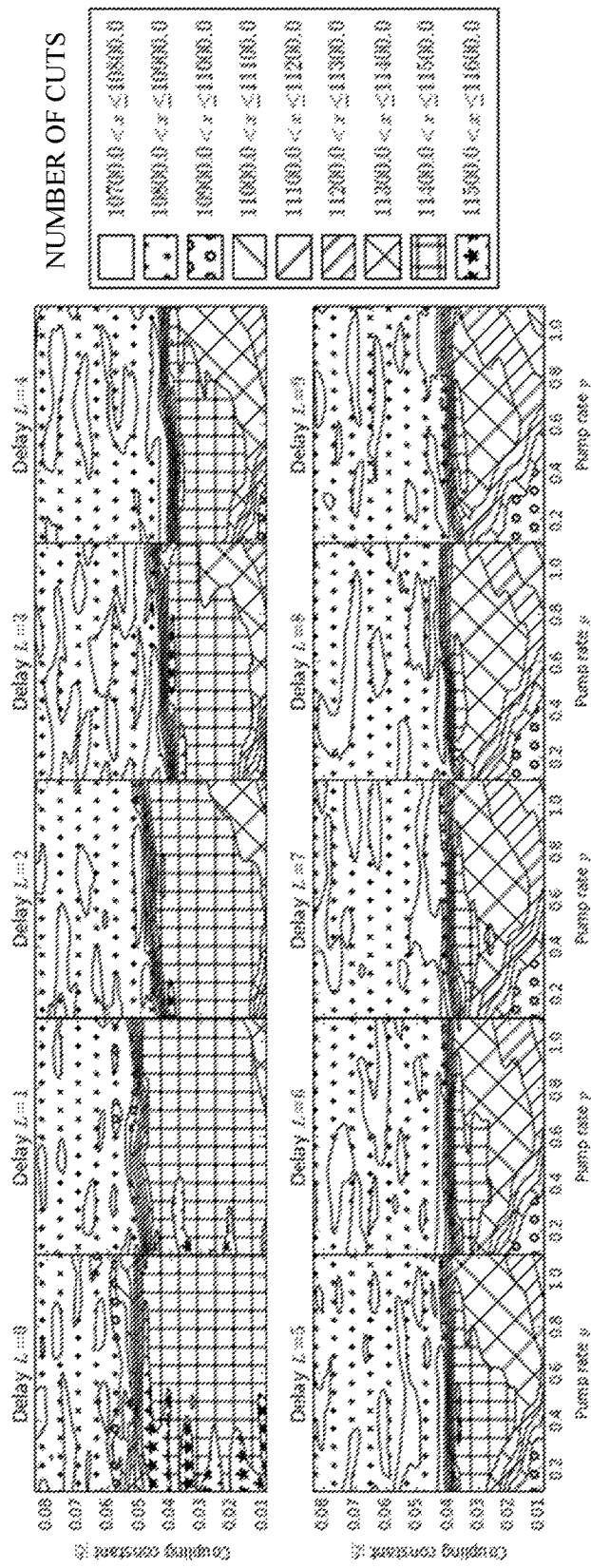
FIG. 18 is a diagram illustrating a computation result of a quantum computation of a random graph in the case where the coupling coefficient $\xi$ and the pump rate p are variable in the second procedure.

A computation result of a quantum computation on a random graph in the case where the coupling coefficient ξ and the pump rate p in the second procedure are variable is illustrated in FIG. 18. In the random graph for the case of FIG. 18, similar to the random graph for the cases of FIGS. 6 to 8 and 15, the number of the vertices is 800, the average degree <k> is 47.94, and the distribution of degrees is a binomial distribution. The coupling coefficient ξ in FIG. 18 is the value before being normalized by √<k>.

The ranges of the coupling coefficient ξ and the pump rate p which give high precision in the quantum computation become greater when the feedback delay decreases, and become smaller (the ranges in vicinities of |ξ|~0.04 and p~0.55) when the feedback delay increases.

Figure 19:
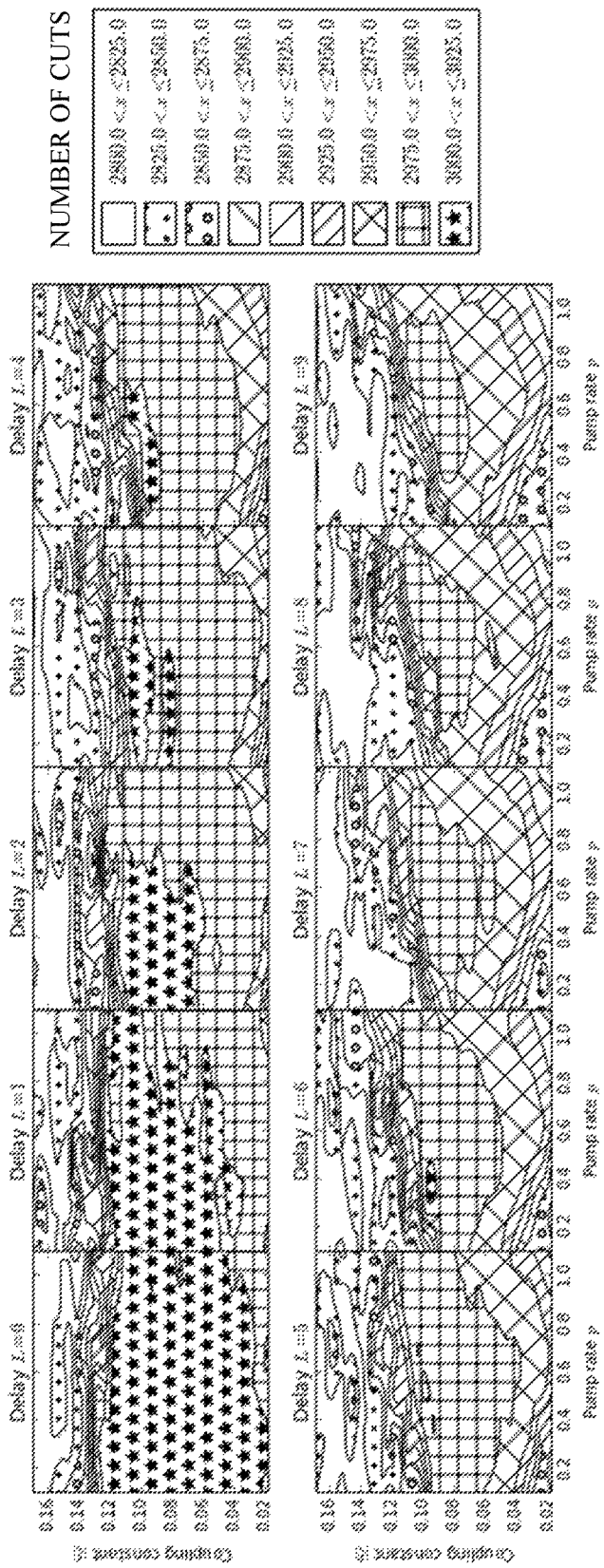
FIG. 19 is a diagram illustrating a computation result of a quantum computation of a scale-free graph in the case where the coupling coefficient $\xi$ and the pump rate p are variable in the second procedure.

A computation result of a quantum computation on a scale-free graph in the case where the coupling coefficient ξ and the pump rate p in the second procedure are variable is illustrated in FIG. 19. In the scale-free graph in FIG. 19, similar to the scale-free graph for the cases of FIGS. 9 to 11 and 16, the number of the vertices is 800, the average degree <k> is 11.735, and the distribution of degrees is a power-law distribution. The coupling coefficient ξ in FIG. 19 is the value before being normalized by √<k>.

The ranges of the coupling coefficient ξ and the pump rate p which give high precision in the quantum computation become greater when the feedback delay decreases, and become smaller (the ranges in vicinities of |ξ|~0.09 and p~0.60) when the feedback delay increases.

In the case where the Ising model corresponding to an NP-complete problem which is desired to be solved is similar to the random graph or the scale-free graph in FIG. 18 or 19, the ranges of the coupling coefficient ξ and the pump rate p which give high precision in the quantum computation in FIG. 18 or 19 can be adopted.

Further, in the case where the number of the sites in the graph similar to the Ising model corresponding to the NP-complete problem which is desired to be solved is small, it is sufficient for the feedback delay to be small, and the ranges of the coupling coefficient ξ and the pump rate p which give high precision in the quantum computation can be easily searched for without exactly solving a combinational optimization problem (of the coupling coefficient ξ and the pump rate p).

However, in the case where the number of the sites in the graph similar to the Ising model corresponding to the NP-complete problem which is desired to be solved is large, a long time of the feedback delay is needed, and it is necessary to exactly solve a combinational optimization problem (of the coupling coefficient ξ and the pump rate p) for obtaining the ranges of the coupling coefficient ξ and the pump rate p which give high precision in the quantum computation. That is, such ranges cannot be easily searched for.

Therefore, in either of the cases where the number of the sites is small and large in the graph similar to the Ising model corresponding to the NP-complete problem which is desired to be solved, the following operations are performed. First, the ranges of the coupling coefficient ξ and the pump rate p which give high precision in the quantum computation in the case where the feedback delay is zero round trips are adopted. Next, as indicated in FIGS. 6 to 14, the coupling coefficient ξ is compensated by the feedback delay of L round trips, and the pump rate p is fixed regardless of the feedback delay of L round trips, or as indicated in FIGS. 15 to 17, the pump rate p is compensated by the feedback delay of L round trips, and the coupling coefficient ξ is fixed regardless of the feedback delay of L round trips.

INDUSTRIAL APPLICABILITY

The Ising model quantum computation device according to the present disclosure is suitable for fast and easily solving an NP-complete problem or the like mapped to an Ising model, and stabilizes the operation of the entire system and lowers the possibility of occurrence of an incorrect answer even in the case where the number of Ising sites is large.

LIST OF REFERENCE SIGNS

Q: Ising model quantum computation device
SP1, SP2, SP3, SP4: Pseudo spin pulses
LO: Local oscillation pulse
1: Degenerate optical parametric oscillator
2: Ring resonator
3: Temporary spin measuring unit
4: Interaction computing unit
5: Interaction implementing unit
6: Pseudo spin measuring unit
7: Ring-resonance-length control unit
8: Local-oscillation-light control unit
9: Injection-pulse control unit
10: Phase sensitive amplifier
71, 81, 91: Light measuring unit
72, 82, 92: Feedback control unit
73, 83, 93: Phase control unit
pin measuring step.

What is claimed is:

1. An Ising model quantum computation device comprising:
a degenerate optical parametric oscillator which causes degenerate optical parametric oscillation of a plurality of pseudo spin pulses corresponding to a plurality of spins in the Ising model in a pseudo manner and having an identical oscillation frequency;
a ring resonator which circularly propagates the plurality of pseudo spin pulses;
a temporary spin measuring unit which temporarily measures pseudo spins of the plurality of pseudo spin pulses by temporarily measuring phases of the plurality of pseudo spin pulses every time the plurality of pseudo spin pulses circularly propagate in the ring resonator, and suspends measurement after one set of measurement is completed before another set of measurement is restarted;
an interaction computing unit which temporarily computes all interactions relating to the plurality of pseudo spin pulses, on the basis of the coupling coefficients of the Ising model and the pseudo spins of the plurality of pseudo spin pulses which the temporary spin measuring unit has most recently measured, after the temporary spin measuring unit completes one set of measurement before the temporary spin measuring unit restarts another set of measurement;
an interaction implementing unit which temporarily implements magnitudes and signs of all the interactions relating to the plurality of pseudo spin pulses which the interaction computing unit has most recently computed, by controlling amplitudes and phases of light injected to the plurality of pseudo spin pulses, after the interaction computing unit completes a temporary computation of all the interactions relating to the plurality of pseudo spin pulses; and
a pseudo spin measuring unit which measures the pseudo spins of the plurality of pseudo spin pulses by measuring the phases of the plurality of pseudo spin pulses after the plurality of pseudo spin pulses reach a steady state while a feedback loop constituted by the temporary spin measuring unit, the interaction computing unit, and the interaction implementing unit is repeated.

2. The Ising model quantum computation device according to claim 1, wherein the ring resonator circularly propagates the plurality of successive pseudo spin pulses, which correspond to the plurality of spins in the Ising model in a pseudo manner; and
the plurality of pseudo spin pulses circularly propagating in the ring resonator each pass once or more times a position of a branch from the ring resonator to the temporary spin measuring unit, after the temporary spin measuring unit completes one set of measurement before the temporary spin measuring unit restarts another set of measurement.

3. The Ising model quantum computation device according to claim 2, wherein the interaction implementing unit controls the amplitudes of the light injected to the plurality of pseudo spin pulses to be greater, when an interval from a time at which the temporary spin measuring unit completes one set of measurement to a time at which the temporary spin measuring unit restarts another set of measurement is longer.

4. The Ising model quantum computation device according to claim 2, wherein the degenerate optical parametric oscillator controls a pump rate in degenerate optical parametric oscillation of the plurality of pseudo spin pulses to be smaller, when an interval from a time at which the temporary spin measuring unit completes one set of measurement to a time at which the temporary spin measuring unit restarts another set of measurement is longer.

5. The Ising model quantum computation device according to claim 2, wherein the interaction implementing unit controls the amplitudes of the light injected to the plurality of pseudo spin pulses to be smaller, when an average degree in graph representation of the Ising model is higher.

6. The Ising model quantum computation device according to claim 1, wherein the ring resonator circularly propagates the plurality of successive pseudo spin pulses which correspond to the plurality of spins in the Ising model in a pseudo manner, and a plurality of successive dummy pulses which do not correspond to the plurality of spins in the Ising model; and the plurality of dummy pulses circularly propagating in the ring resonator each pass once a position of a branch from the ring resonator to the temporary spin measuring unit, after the temporary spin measuring unit completes one set of measurement before the temporary spin measuring unit restarts another set of measurement.

7. The Ising model quantum computation device according to claim 6, wherein the degenerate optical parametric oscillator controls oscillation phases and oscillation intensities of the plurality of dummy pulses to a predetermined phase and a predetermined intensity, respectively; and the Ising model quantum computation device performs calibration of a phase characteristic of the quantum computation device by using the plurality of dummy pulses as a reference signal.

8. The Ising model quantum computation device according to claim 7, further comprising a ring-resonance-length control unit which controls a resonance length of the ring resonator such that the oscillation intensities of the plurality of dummy pulses are maximized to a predetermined intensity.

9. The Ising model quantum computation device according to claim 8, further comprising a local-oscillation-light control unit controlling interference timings between the plurality of pseudo spin pulses and local oscillation light which the temporary spin measuring unit uses for measurement of the phases of the plurality of pseudo spin pulses, such that a result of interference between the plurality of dummy pulses and the local oscillation light which the temporary spin measuring unit uses for measurement of the phases of the plurality of pseudo spin pulses becomes a predetermined interference result which is expected from a predetermined oscillation phase of the plurality of dummy pulses.

10. The Ising model quantum computation device according to claim 9, further comprising an injection-pulse control unit controlling interference timings between the plurality of pseudo spin pulses and a plurality of spin injection pulses having oscillation phases with consideration of interactions used by the interaction implementing unit for light injection to the plurality of pseudo spin pulses, such that a result of interference between the plurality of dummy pulses and a plurality of dummy injection pulses having a predetermined oscillation phase used by the interaction implementing unit for light injection to the plurality of dummy pulses becomes a predetermined interference result which is expected from a predetermined oscillation phase of the plurality of dummy pulses.

11. The Ising model quantum computation device according to claim 8, further comprising an injection-pulse control unit controlling interference timings between the plurality of pseudo spin pulses and a plurality of spin injection pulses having oscillation phases with consideration of interactions used by the interaction implementing unit for light injection to the plurality of pseudo spin pulses, such that a result of interference between the plurality of dummy pulses and a plurality of dummy injection pulses having a predetermined oscillation phase used by the interaction implementing unit for light injection to the plurality of dummy pulses becomes a predetermined interference result which is expected from a predetermined oscillation phase of the plurality of dummy pulses.

12. The Ising model quantum computation device according to claim 7, further comprising a local-oscillation-light control unit controlling interference timings between the plurality of pseudo spin pulses and local oscillation light which the temporary spin measuring unit uses for measurement of the phases of the plurality of pseudo spin pulses, such that a result of interference between the plurality of dummy pulses and the local oscillation light which the temporary spin measuring unit uses for measurement of the phases of the plurality of pseudo spin pulses becomes a predetermined interference result which is expected from a predetermined oscillation phase of the plurality of dummy pulses.

13. The Ising model quantum computation device according to claim 12, further comprising an injection-pulse control unit controlling interference timings between the plurality of pseudo spin pulses and a plurality of spin injection pulses having oscillation phases with consideration of interactions used by the interaction implementing unit for light injection to the plurality of pseudo spin pulses, such that a result of interference between the plurality of dummy pulses and a plurality of dummy injection pulses having a predetermined oscillation phase used by the interaction implementing unit for light injection to the plurality of dummy pulses becomes a predetermined interference result which is expected from a predetermined oscillation phase of the plurality of dummy pulses.

14. The Ising model quantum computation device according to claim 7, further comprising an injection-pulse control unit controlling interference timings between the plurality of pseudo spin pulses and a plurality of spin injection pulses having oscillation phases with consideration of interactions used by the interaction implementing unit for light injection to the plurality of pseudo spin pulses, such that a result of interference between the plurality of dummy pulses and a plurality of dummy injection pulses having a predetermined oscillation phase used by the interaction implementing unit for light injection to the plurality of dummy pulses becomes a predetermined interference result which is expected from a predetermined oscillation phase of the plurality of dummy pulses.

15. The Ising model quantum computation device according to claim 6, wherein the interaction implementing unit controls the amplitudes of the light injected to the plurality of pseudo spin pulses to be greater, when an interval from a time at which the temporary spin measuring unit completes one set of measurement to a time at which the temporary spin measuring unit restarts another set of measurement is longer.

16. The Ising model quantum computation device according to claim 6, wherein the degenerate optical parametric oscillator controls a pump rate in degenerate optical parametric oscillation of the plurality of pseudo spin pulses to be smaller, when an interval from a time at which the temporary spin measuring unit completes one set of measurement to a time at which the temporary spin measuring unit restarts another set of measurement is longer.

17. The Ising model quantum computation device according to claim 6, wherein the interaction implementing unit controls the amplitudes of the light injected to the plurality of pseudo spin pulses to be smaller, when an average degree in graph representation of the Ising model is higher.

18. The Ising model quantum computation device according to claim 1, wherein the interaction implementing unit controls the amplitudes of the light injected to the plurality of pseudo spin pulses to be greater, when an interval from a time at which the temporary spin measuring unit completes one set of measurement to a time at which the temporary spin measuring unit restarts another set of measurement is longer.

19. The Ising model quantum computation device according to claim 1, wherein the degenerate optical parametric oscillator controls a pump rate in degenerate optical parametric oscillation of the plurality of pseudo spin pulses to be smaller, when an interval from a time at which the temporary spin measuring unit completes one set of measurement to a time at which the temporary spin measuring unit restarts another set of measurement is longer.

20. The Ising model quantum computation device according to claim 1, wherein the interaction implementing unit controls the amplitudes of the light injected to the plurality of pseudo spin pulses to be smaller, when an average degree in graph representation of the Ising model is higher.

\* \* \* \* \*